Feb. 19, 1935. C. CHISHOLM Re. 19,468

TYPESETTING MACHINE

Original Filed Jan. 22, 1929 14 Sheets-Sheet 1

Inventor

Clifford Chisholm

By Baker Sobrier & Kear

Attorneys

Feb. 19, 1935. C. CHISHOLM Re. 19,468

TYPESETTING MACHINE

Original Filed Jan. 22, 1929 14 Sheets-Sheet 2

Feb. 19, 1935. C. CHISHOLM Re. 19,468

TYPESETTING MACHINE

Original Filed Jan. 22, 1929 14 Sheets-Sheet 3

Inventor

Clifton Chisholm

By Baker, Golrick & Fean

Attorneys

Feb. 19, 1935. C. CHISHOLM Re. 19,468

TYPESETTING MACHINE

Original Filed Jan. 22, 1929 14 Sheets-Sheet 4

Inventor

Clifton Chisholm

By Baker Golnick & Tear

Attorneys

Feb. 19, 1935. C. CHISHOLM Re. 19,468

TYPESETTING MACHINE

Original Filed Jan. 22, 1929 14 Sheets-Sheet 5

Inventor

Clifton Chisholm

By Baker, Golnick & Teare

Attorneys

Feb. 19, 1935. C. CHISHOLM Re. 19,468
TYPESETTING MACHINE
Original Filed Jan. 22, 1929 14 Sheets-Sheet 6
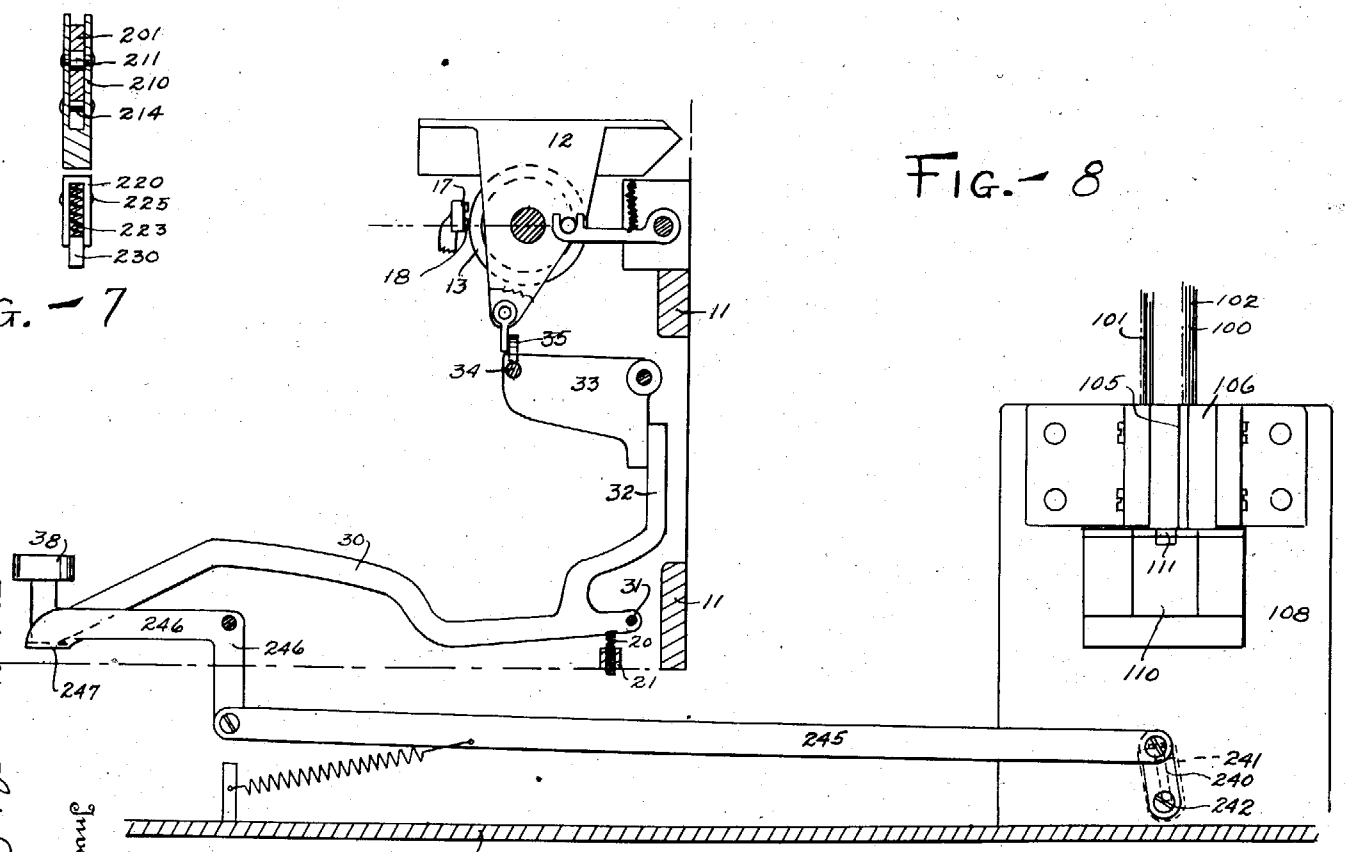

Feb. 19, 1935. C. CHISHOLM Re. 19,468
TYPESETTING MACHINE
Original Filed Jan. 22, 1929 14 Sheets-Sheet 7
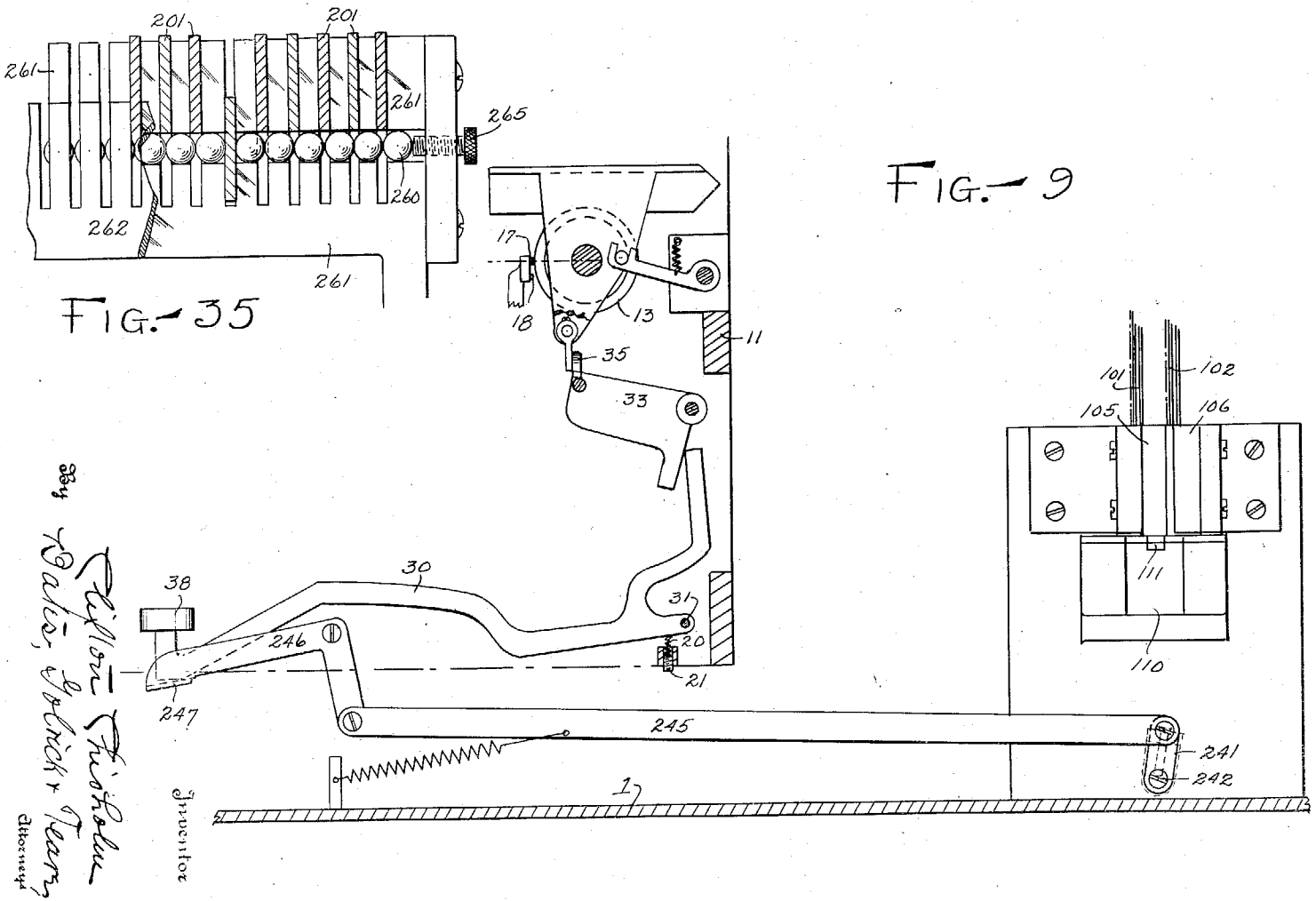
Inventor
Clifton Chisholm
By Bates, Golrick & Teare
Attorneys Feb. 19, 1935. C. CHISHOLM Re. 19,468
TYPESETTING MACHINE
Original Filed Jan. 22, 1929 14 Sheets-Sheet 8
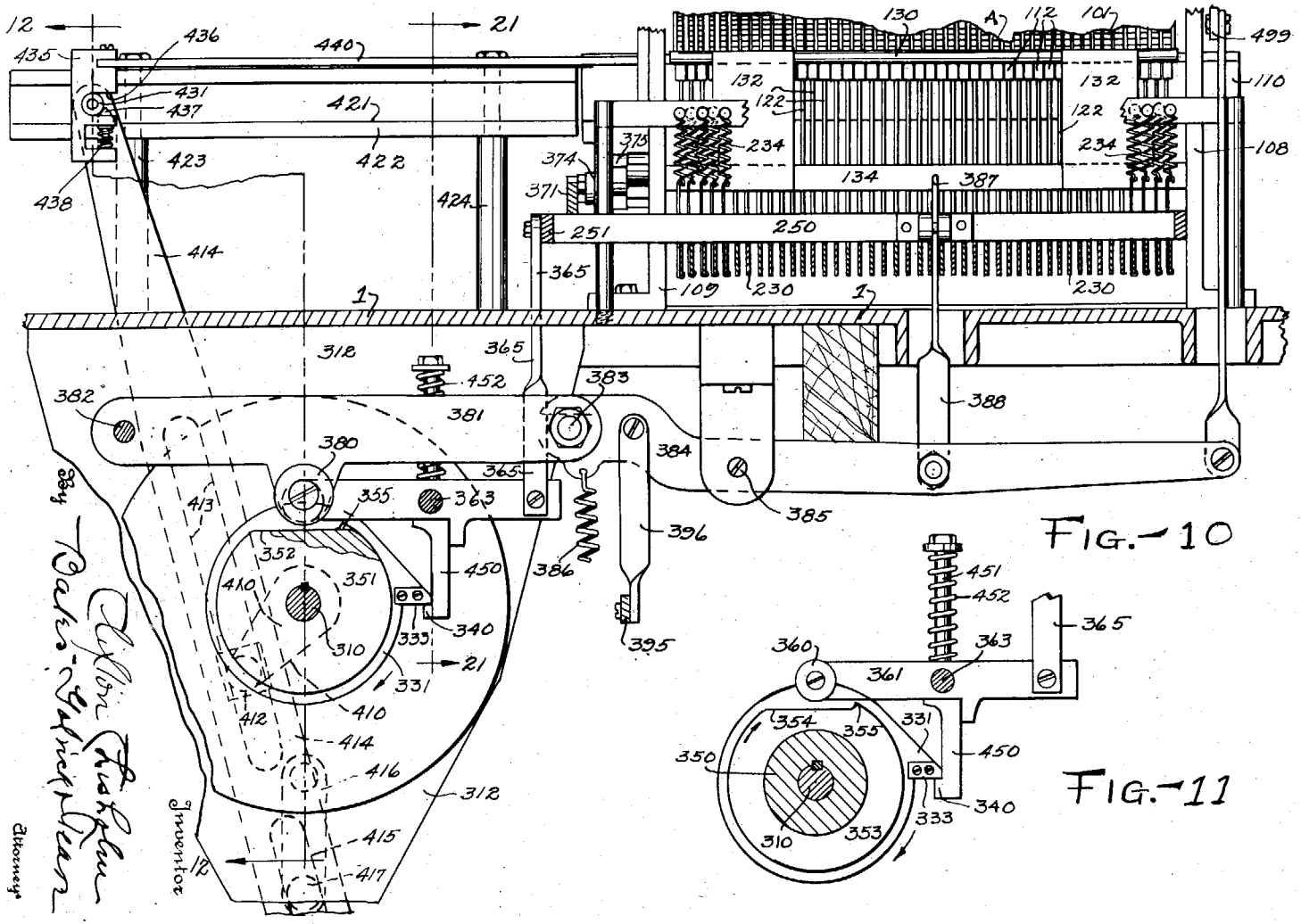

TYPESETTING MACHINE
Original Filed Jan. 22, 1929 14 Sheets-Sheet 9
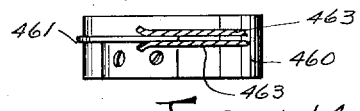
FIG. 14
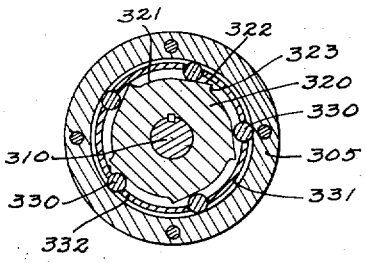
FIG. 16
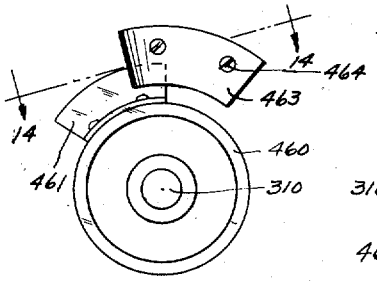
FIG. 13
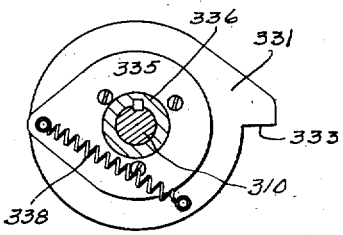
FIG. 15
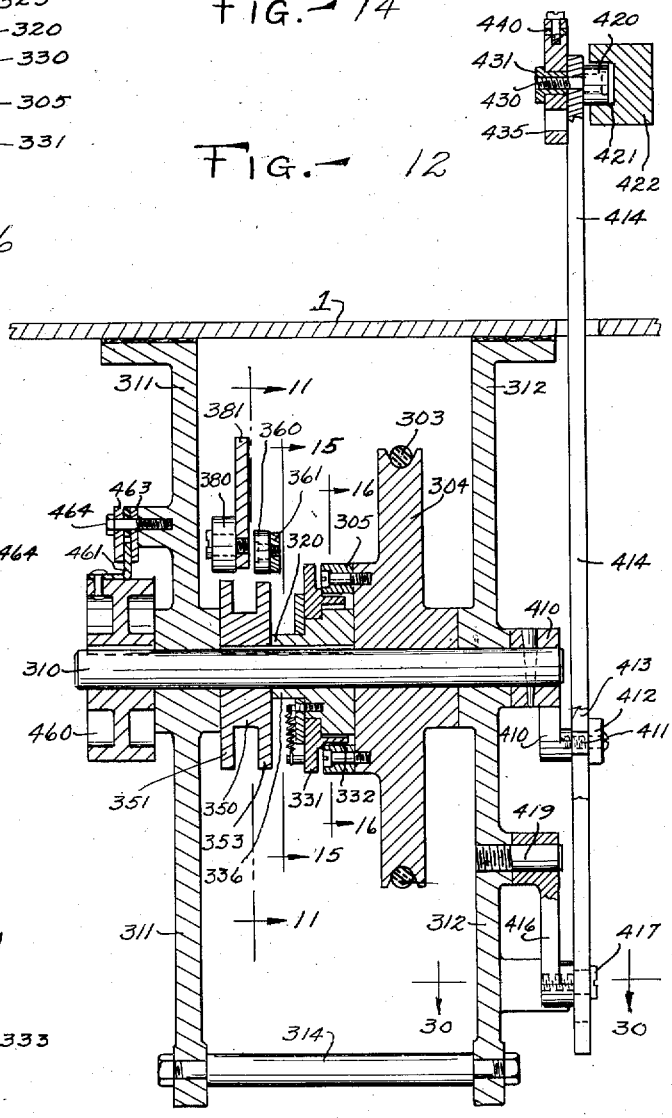
Inventor
Clifton Chisholm
By Dalas Gobrick & Tear
Attorneys Feb. 19, 1935. C. CHISHOLM Re. 19,468
TYPESETTING MACHINE
Original Filed Jan. 22, 1929 14 Sheets-Sheet 10
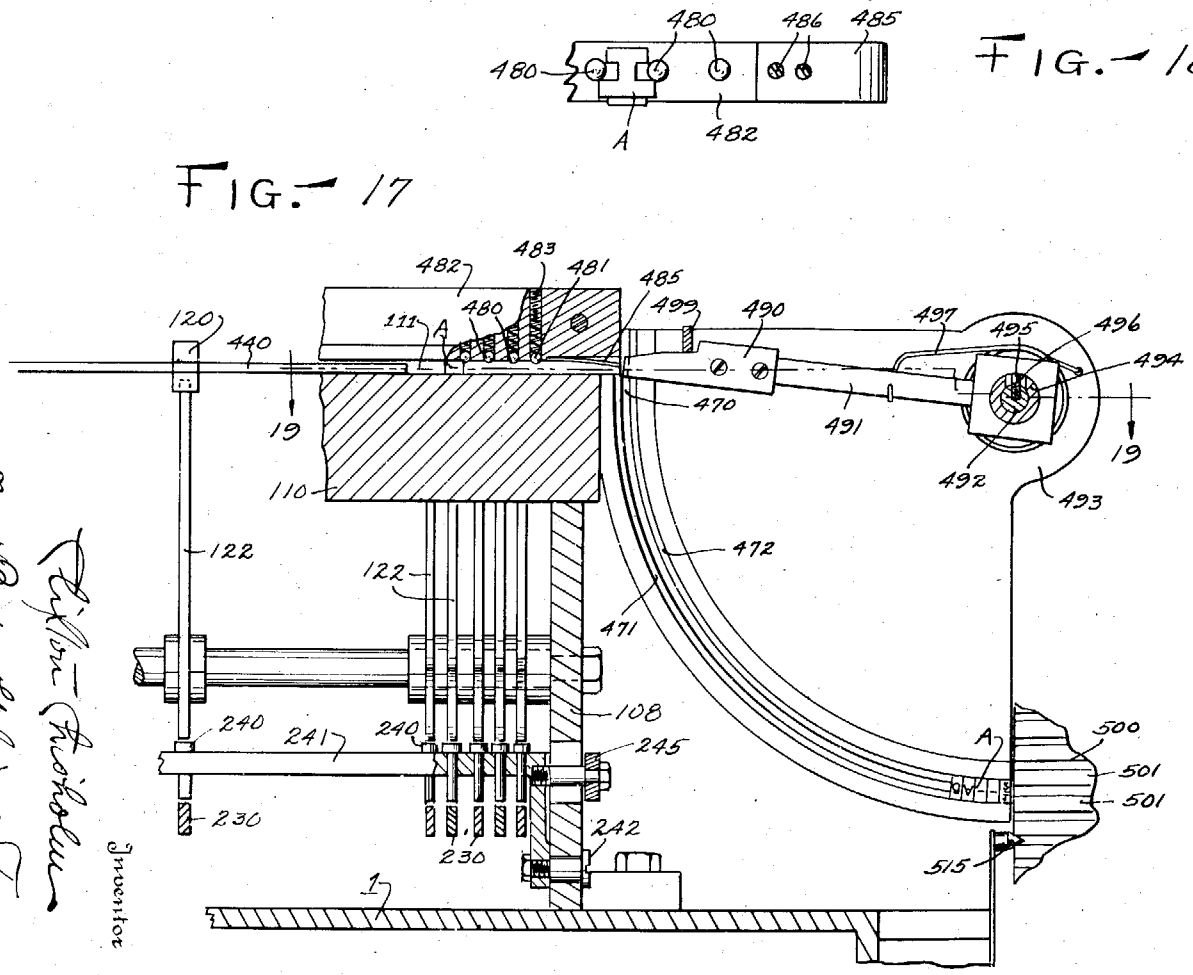

TYPESETTING MACHINE

Original Filed Jan. 22, 1929 14 Sheets-Sheet 11

Inventor

Clifton Chisholm

By Bates, Golrick & Kean

Attorneys

TYPESETTING MACHINE

Original Filed Jan. 22, 1929 14 Sheets-Sheet 12

Inventor

Clifton Chisholm

By Bates Gobrick & Tear

Attorneys

Feb. 19, 1935. C. CHISHOLM Re. 19,468

TYPESETTING MACHINE

Original Filed Jan. 22, 1929 14 Sheets-Sheet 13

Inventor

Clifton Chisholm

By Baker, Golnick & Teare

Attorneys

Feb. 19, 1935. C. CHISHOLM Re. 19,468

TYPESETTING MACHINE

Original Filed Jan. 22, 1929 14 Sheets-Sheet 14

Inventor

Clifton Chisholm

By Baker, Golrick & Teare,

Attorneys

Reissued Feb. 19, 1935

Re. 19,468

UNITED STATES PATENT OFFICE 19,468

TYPESETTING MACHINE

Clifton Chisholm, Cleveland, Ohio, assignor, by mesne assignments, to Multigraph Company, Wilmington, Del., a corporation of Delaware Original No. 1,889,914, dated December 6, 1932, Serial No. 334,200, January 22, 1929. Application for reissue October 6, 1934, Serial No. 747,198

80 Claims. (Cl. 276—3)

Figure 1:
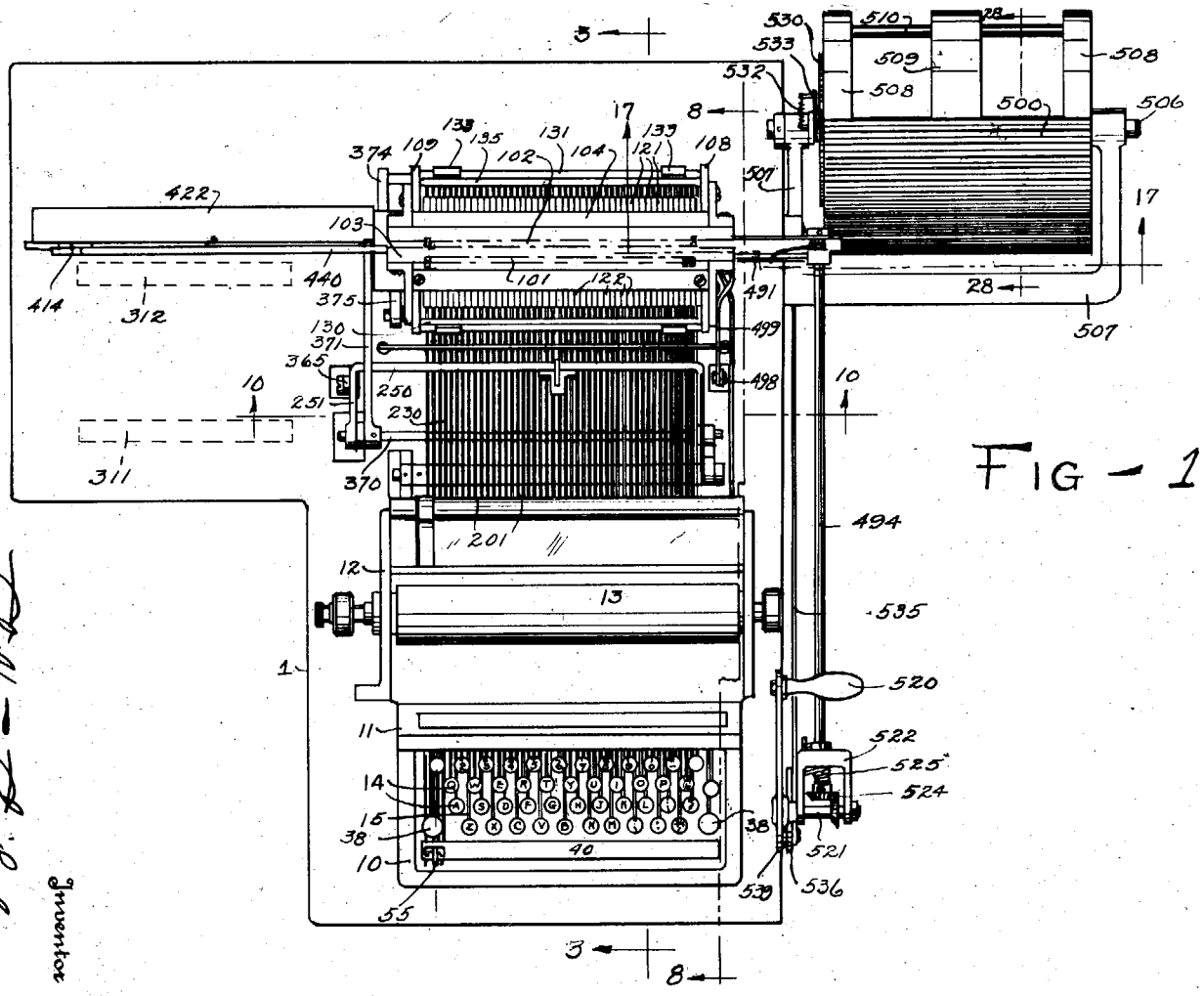

This invention relates to a keyboard operated typesetting machine, and is particularly concerned with such provisions of the mechanism as will enable the rapid assemblage of short grooved type, such as used in the multigraph. Preferably the assemblage is made directly onto a channeled multigraph segment, which may thereafter be installed in a multigraph for printing in cooperation with a suitable platen. Positiveness of operation and continuous control of the type from the time it leaves the case until it is mounted in the assemblage member is one of the objects of the invention.

Another object of the invention is to provide for printing a reproduction of the characters as they are being assembled, thus providing at once a guide to the operator and a proof of the assembled matter. In accomplishing this, I employ both as the printer and the keyboard for the typesetting machine, a standard typewriter which is so mounted and connected that its keys may be operated in the usual manner to print on paper on the carriage and at the same time effect the selection of a corresponding type in the case, which is thereupon ejected and is added to a line of characters being formed.

One of the features of my invention comprises arranging the selecting mechanism of the type setter which is operated by the typewriter in such manner that no positive connection of the typewriter is required. When the typewriter is put into place, it automatically comes into position with relation to the selecting mechanism, the keys of the typewriter operating by a push on the selecting mechanism to effect the conjoint operation; but whenever desired the typewriter may be simply lifted off for use elsewhere by simply disconnecting the clamps which engage its frame.

A very valuable feature of my invention is the provision of means absolutely preventing the transposition of characters, no matter how rapid the keyboard may be operated. This is effected by automatically locking the keyboard and type selector against subsequent operation as soon as any key is depressed, and continuing such locking until after the ejected type is actually in the assembled line.

Ease of manual operation of the machine is also one of the features of the invention, and this I effect by constraining the selecting mechanism by power and provide triggers to be released by the typewriter keys, so that hardly any more work is required of the operator than that usual in manipulating the typewriter.

Another feature which aids in the continuous assemblage of the type, by reducing the frequency of replenishment of type channels, is the provision of multiple channels for the most frequently used characters, especially the space quads, and shift mechanism associated with the key relating to such character to enable the operator to change instantly from one channel to another when the former channel becomes empty.

Other features of the invention, contributing to the efficiency of the complete operation, will be apparent from the following detailed description of an embodiment of the invention, the essential novel features of which are summarized in the claims.

Figure 2:
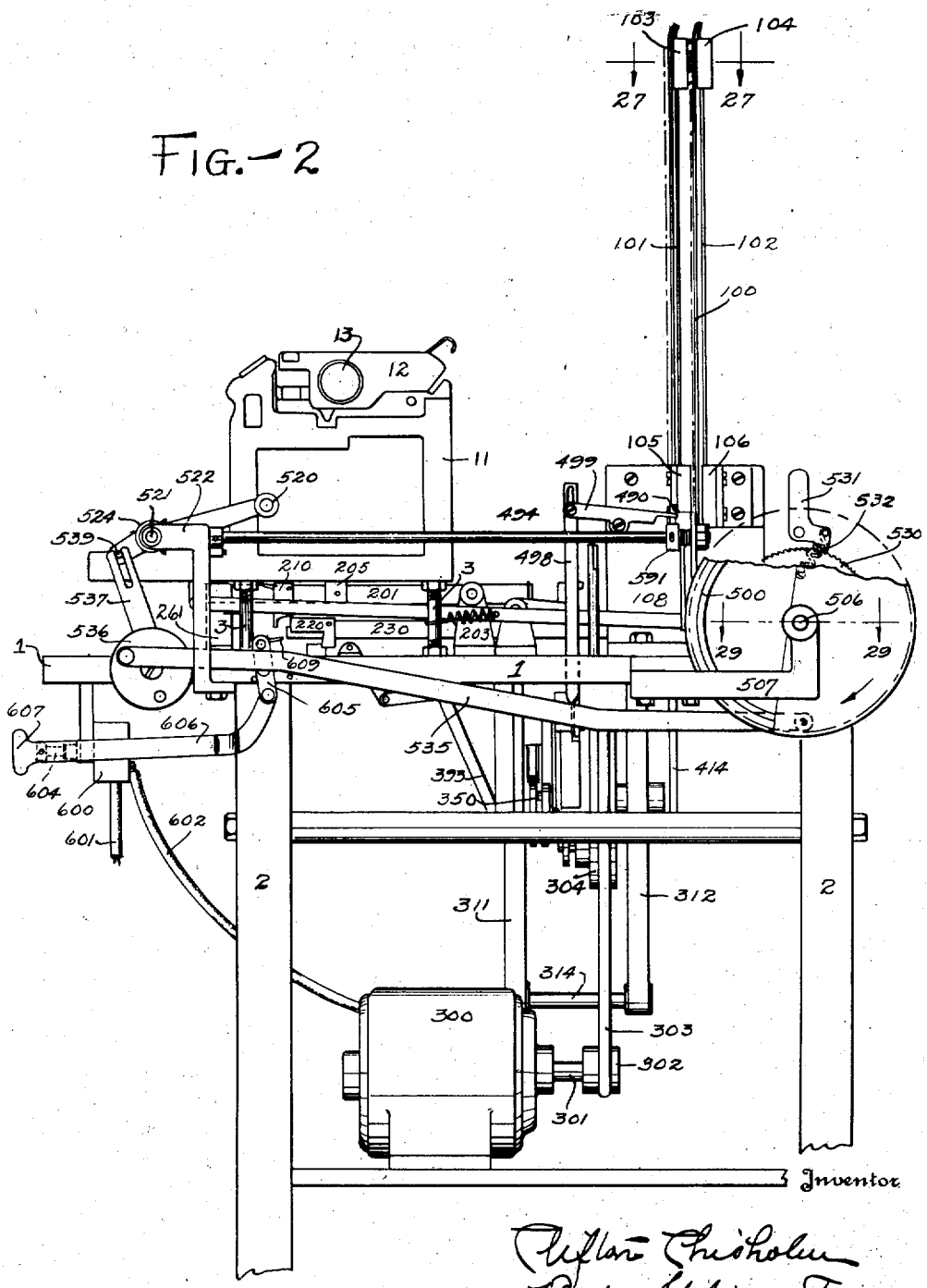
Figure 3:
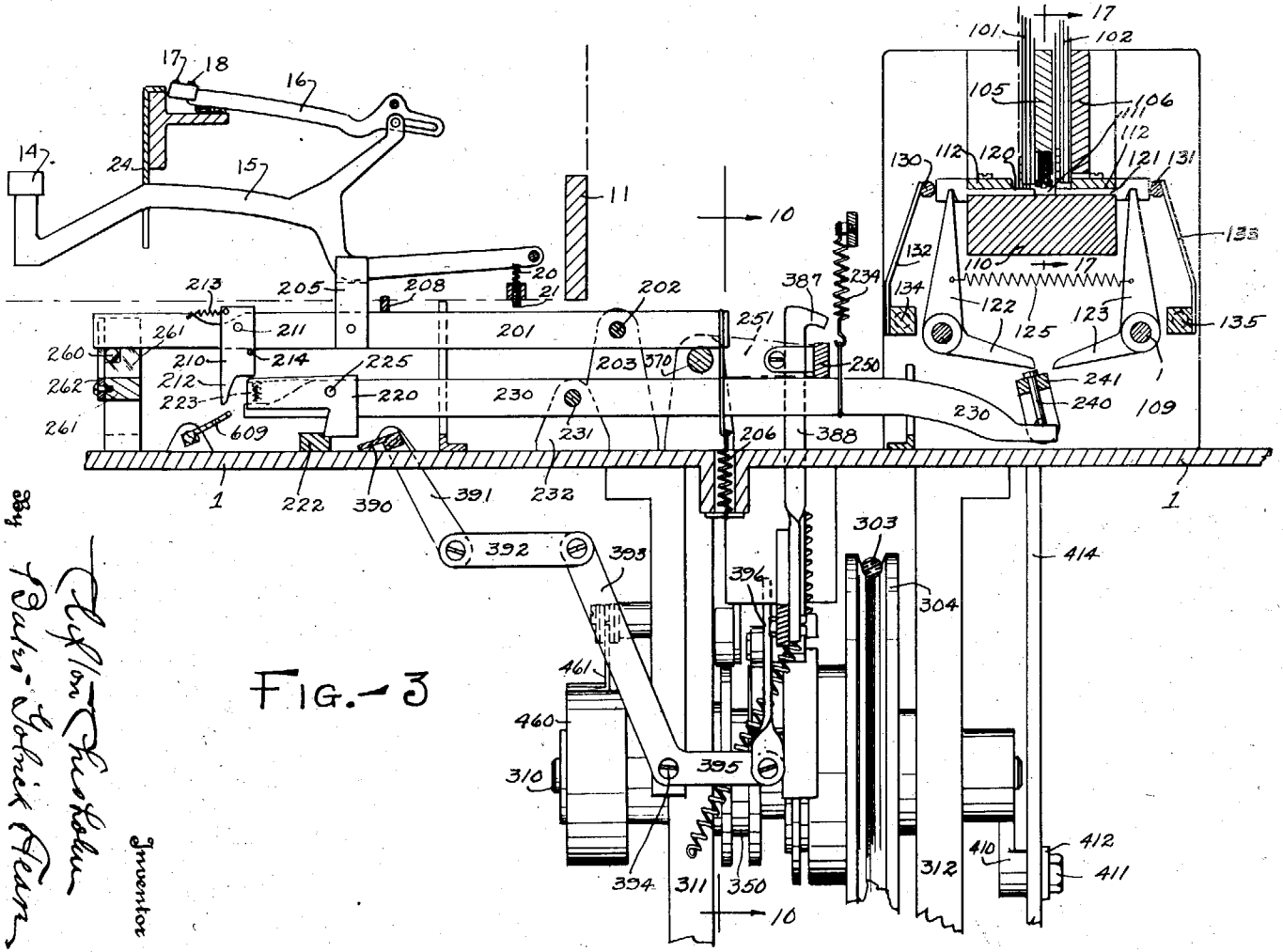
Figure 4:
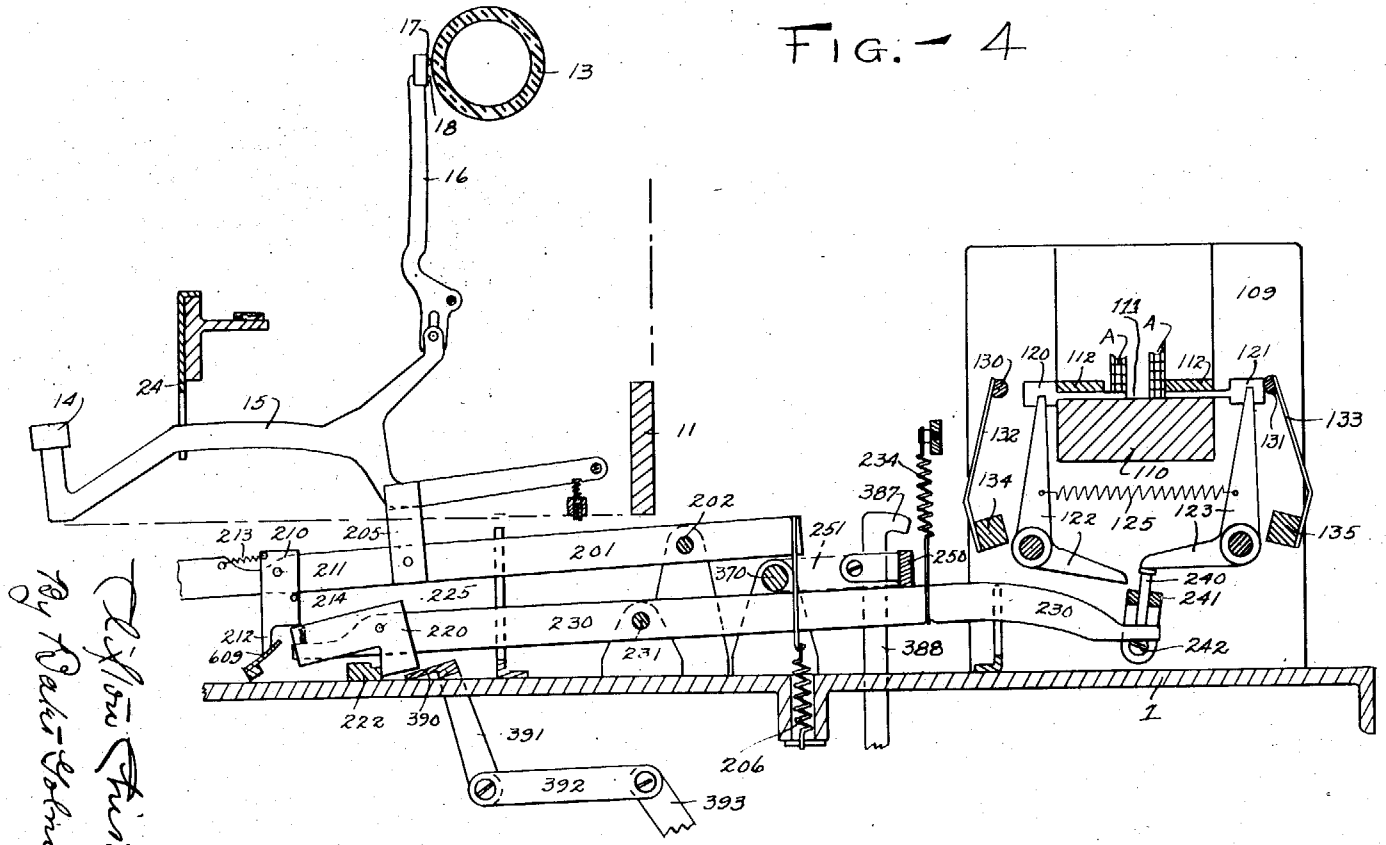
Figures 5, 6:
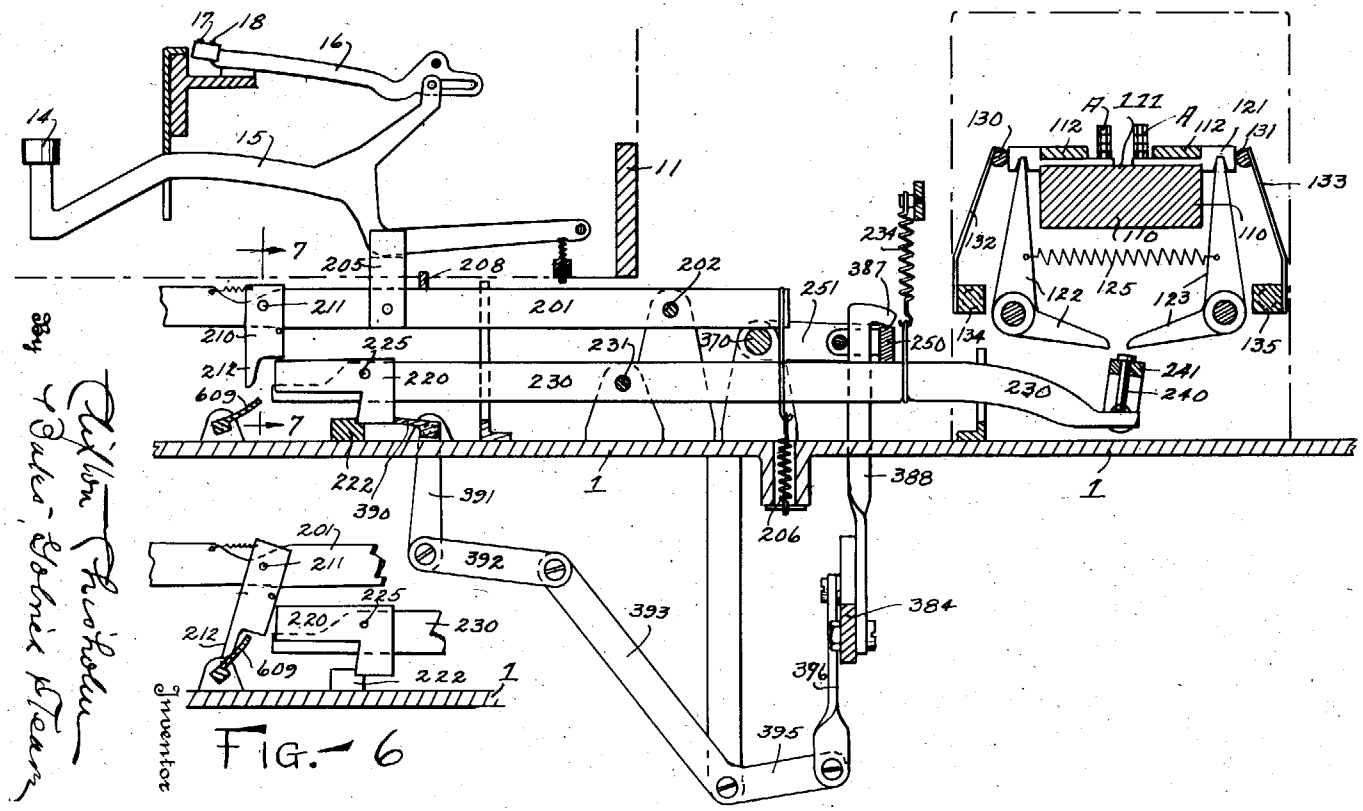
Figure 19:
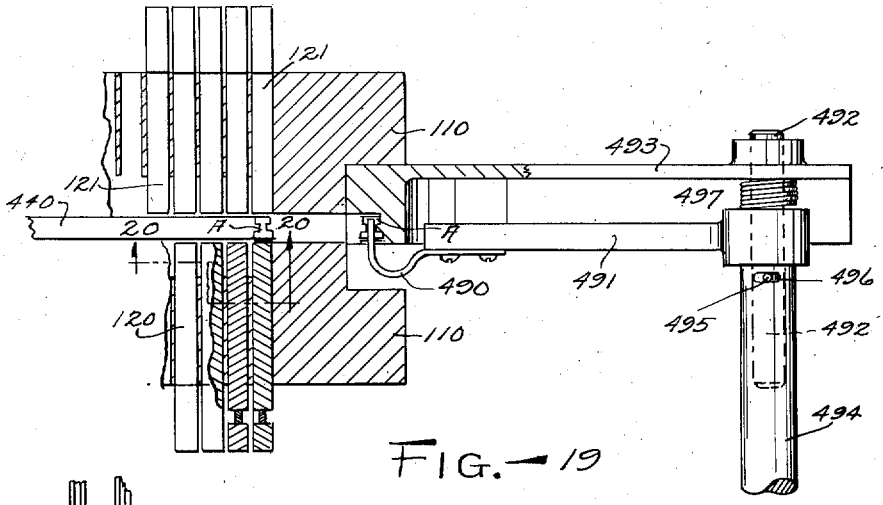
Figure 20:
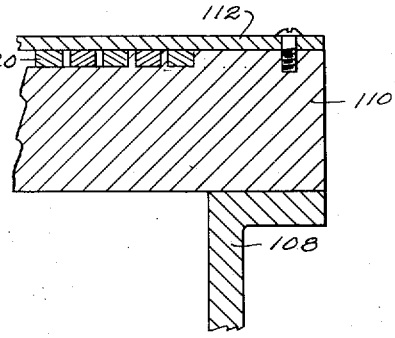
Figure 21:
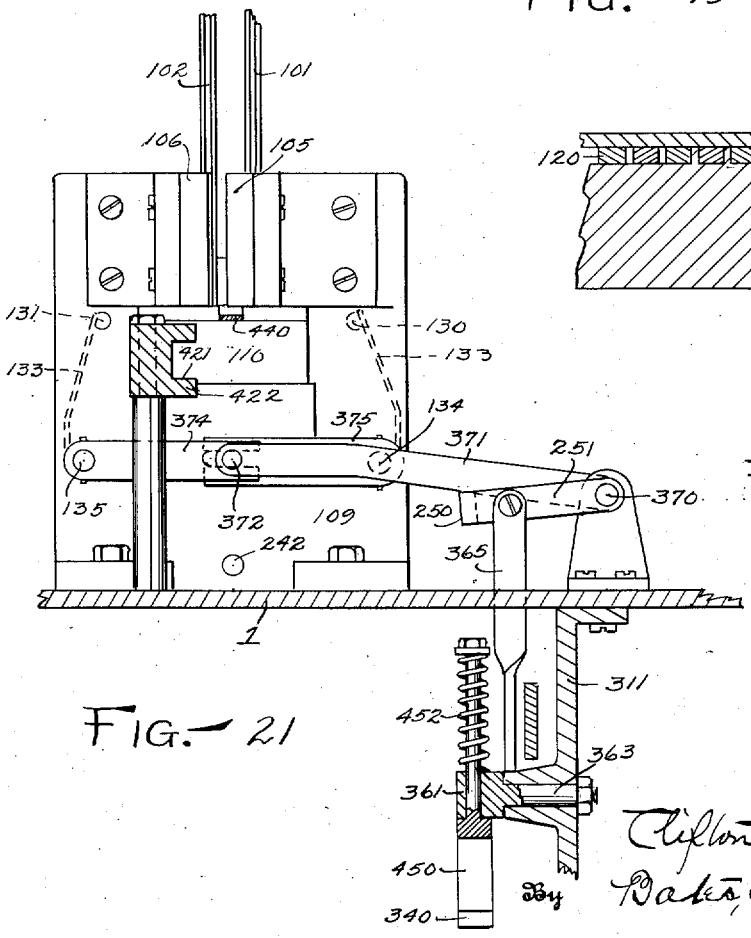
Figure 26:
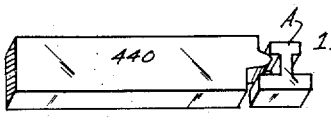
Figure 27:
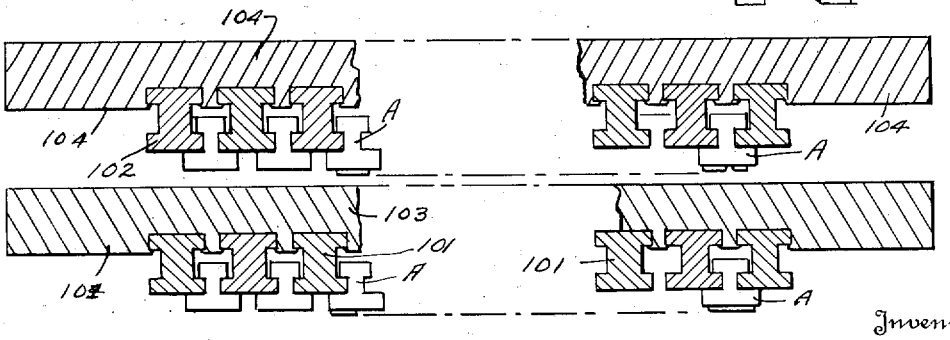
Figure 28:
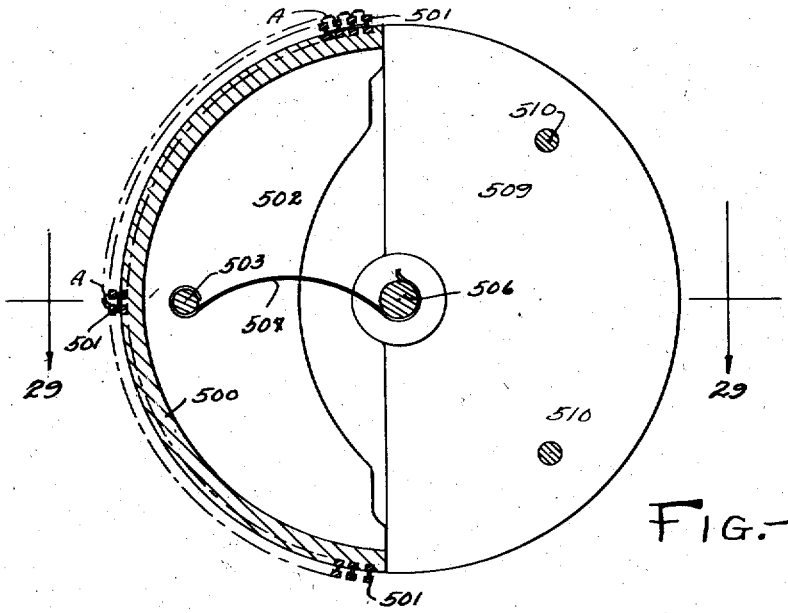
Figure 29:
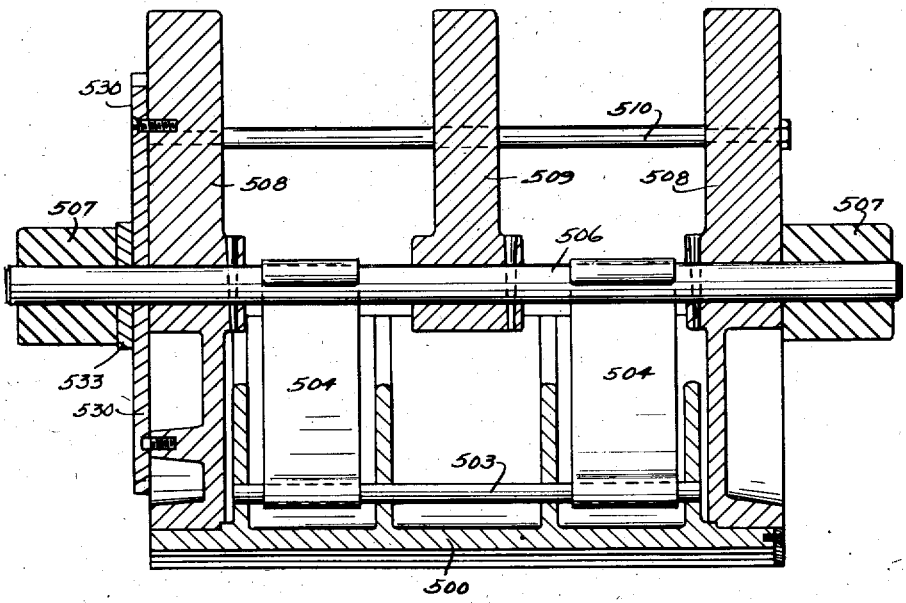
Figure 32:
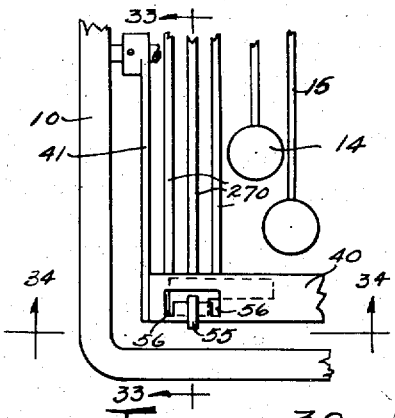
Figure 34:
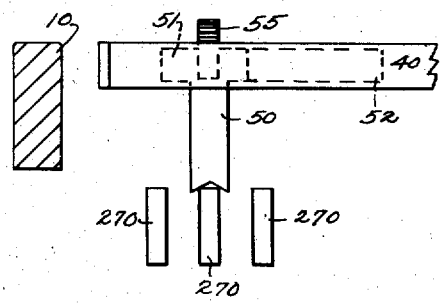
Figure 33:
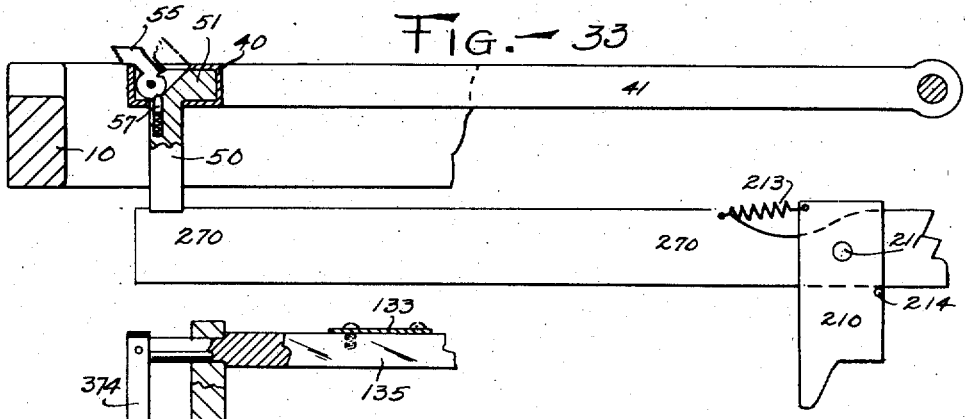
Figure 31:
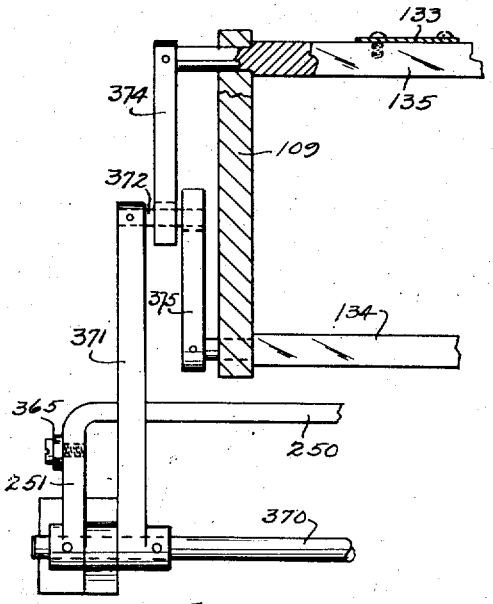
Figure 30:
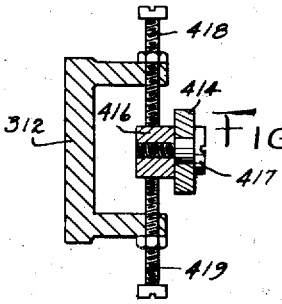

In the drawings, Fig. 1 is a plan of the complete machine; Fig. 2 is an end elevation thereof; Fig. 3 is a vertical section on a plane indicated by the line 3—3 in Fig. 1; Figs. 4 and 5 are vertical sections on the same plane as Fig. 3, but indicating certain parts in different positions; Fig. 6 is a detail elevation in the same plane with Figs. 3, 4 and 5 illustrating the key lever latch in a different position; Fig. 7 is a detail illustrating a portion of the latch in vertical cross section as indicated by the line 7—7 in Fig. 5; Fig. 8 is a vertical section substantially on the offset line 8—8 in Fig. 1, illustrating the shift lever mechanism; Fig. 9 is a view of the same parts as Fig. 8, but in a different position; Fig. 10 is a vertical section at right angles to the plane of Figs. 3, 4 and 5, being indicated by the line 10—10 in Figs. 1 and 3; Fig. 11 is a detail in vertical section of the main cam and cooperating parts, most of which are shown in a parallel plane in Fig. 10, the plane of Fig. 11 being indicated by the line 11—11 in Fig. 12; Fig. 12 is a vertical transverse section through the clutch mechanism and main cam in the offset plane indicated by the line 12—12 in Fig. 10; Fig. 13 is a side elevation of a brake on the main cam shaft shown in section in Fig. 12; Fig. 14 is a section of the brake as indicated by the line 14—14 in Fig. 13; Figs. 15 and 16 are vertical sections on the correspondingly numbered lines in Fig. 12, illustrating the single rotation clutch; Fig. 17 is a vertical section on the offset plane indicated by the line 17—17 in Fig. 1, illustrating the drum loading mechanism; Fig. 18 is a detail illustrating the detent for positioning the ejected type, being a bottom plan on an enlarged scale of parts shown in Fig. 17; Fig. 19 is a fragmentary sectional plan on the offset plane indicated by the line 19—19 in Fig. 17; Fig. 20 is a detail in vertical section on the offset plane indicated by the line 20—20 in Fig. 19; Fig. 21 is a view of mechanism for moving the type case plungers, being a vertical section on the plane indicated by the line 21—21 in Fig. 10; Figs. 22 to 25 inclusive are in the nature of perspective diagrams illustrating the action of the transferring bar and ejected type; Fig. 26 is a sectional perspective of the upper end of the loading channel and the horizontal guideway for the type leading thereto; Fig. 27 is an enlarged horizontal section through the type case, as indicated by the line 27—27 in Fig. 2; Fig. 28 is a radial section through the multigraph drum, mounted in position for receiving the type; Fig. 29 is a horizontal section through the mounted multigraph drum as indicated by the line 29—29 on Fig. 28; Fig. 30 is a detail in horizontal section illustrating the adjustable pivot for one of the levers of the machine, the plane of the section being indicated by the line 30—30 on Fig. 12; Fig. 31 is an enlarged sectional plan illustrating the rocking mechanism for operating the type ejecting bars; Figs. 32, 33 and 34 are views illustrating mechanism enabling a plurality of channels for type spaces to be utilized by the same space bar of the typewriter—Fig. 32 being a fragmentary plan and Figs. 33 and 34 vertical cross sections on the correspondingly numbered lines in Fig. 32; Fig. 35 (Sheet 7) is a detail of a device for preventing the depression of two key-actuated levers at the same time, being a front elevation of parts shown in end view in Fig. 3.

Briefly, as illustrated in Figs. 1, 2 and 3, my typesetting machine comprises several correlated instrumentalities, to which, I have apportioned reference numerals as follows:

1st. A standard typewriter covered by reference numerals 1 to 99, which include the supporting frame;

2nd. An upright duplex type case having channels apportioned to the different type characters equipped with ejecting plungers, 100 to 199;

3rd. Normally constrained mechanism released by the keys of the typewriter for selecting the type-ejecting plungers 200 to 299;

4th. Power operated mechanism released by the selecting mechanism for operating the selected plunger to eject type from the bottom of the type case 300 to 399;

5th. Subsequently acting power mechanism for transferring the ejected type to add it to the line being formed 400 to 499;

6th. A multi-channeled type holder 500 to 599 in which successive lines are assembled into a page form suitable for printing;

7th. Certain manual controls—600 up.

The main frame of my complete machine includes a bed plate 1 which is supported on suitable legs 2. The frame 11 of the typewriter is supported by the bed 1 preferably by means of standards 3 rising from the bed. The typewriter frame may be clamped to the bed by any suitable typewriter clamp not shown. The key lever mechanism of the typewriter, however, simply has a push connection with the typesetter mechanism, enabling the typewriter to be readily lifted off when its frame is released.

The typewriter machine may be of any suitable form, preferably one of the existing standard machines, and, as shown, comprises the frame 11, paper carriage 12, platen roller 13 carried thereby, finger keys 14, key levers 15, type bars 16 operated by the key levers to print on paper against the platen. Each type bar has upper and lower case characters 17 and 18, selected by movement of the carriage by a shift key as later explained. The inking ribbon of the typewriter and various other parts are omitted from the drawings, as they will be well understood.

The type case in which the type is stored, comprises a series of parallel upright rails 101 and 102 with overhanging edges and suitable cross members 103 and 104 near the top of the rails, and 105 and 106 near the bottom thereof, secured to the backs of the rails. These rails are preferably I-shaped in cross section, as illustrated in Fig. 27, and they occupy grooves in the cross plates, the base flange of the rails seating in such grooves, and the metal of the plate being peened over the rail base. I thus provide a pair of rigid multi-channeled upright members having their channels undercut, whereby they are adapted to confine type grooved on its opposite sides, such type being of the character illustrated at A, Figs. 22 to 27 inclusive.

The cross bars 105 and 106 to which the vertical rails of the type case are secured extend crosswise of the machine and are secured at their ends to angle brackets 107 which in turn are secured to vertical plates 108 and 109 which are secured to the frame plate. The vertical plates also carry the cross bar 110 which forms the base for the channels, the support for the plungers, and provides the intermediate ledge or runway 111 onto which the type are ejected.

One of the type banks for instance the forward bank 101 is designed to carry lower case type and the other bank (102) carry the corresponding type of the upper case. The type in both banks face forwardly. The type descend by gravity to the lower end of their cases from which the bottommost type of the channel may be ejected by mechanism released by the corresponding key in the typewriter. The type is ejected from the front bank 101 rearwardly and from the rear bank 102 forwardly, so that in either case they come onto the intermediate ledge. As the typewriter is provided with a shift key, enabling each key lever to print either of two characters, I provide shift mechanism for the type case, coupled with the typewriter shift key, whereby lower case characters on the typewriter serve to eject lower case characters on the type case, for example. This will be hereinafter explained.

Extending through the bottoms of the respective type cases, are plungers 120 and 121, one for each type channel, each plunger occupying a groove in the base bar 110. Plates 112 extending across the grooves outside of the type case proper, complete the guides for the plungers.

Each plunger 120 or 121 is engaged by a corresponding bell crank 122 or 123, the upper ends of which enter notches on the undersides of the plungers, while the lower arms of the bell cranks furnish means by which they are operated as later explained. The corresponding front and back bell cranks are constrained toward each other by a light tension spring 125, which tends to keep the plungers in their innermost positions. Standing in registration with the outer ends of the plungers, are a pair of universal cross rods 130 and 131, mounted on spring arms 132 or 133, leading from rock shafts 134 or 135. When the machine is idle, the cross rods 130 and 131 bear against the outer ends of all the plungers, but, when any bell crank is operated to withdraw the plunger, that action carries back the corresponding cross rods.

As soon as a plunger is withdrawn, the bottommost type in the channel, which was resting on top of the plunger, will now drop in front of it. The side ribs of the rails of the type case terminate a distance above the plate 110 somewhat greater than the thickness of a type, so that when a type drops in front of a plunger, it is released from the rails which had occupied its grooves; also the webs of the base bar 110, which stand between the plungers, terminate short of the type case rails, so that the type in front of the withdrawn plunger is free from lateral confinement. Thereafter suitable mechanism, to be described, rocks the shaft 134 or 135, forcing the withdrawn plunger into the type case and ejecting the bottommost type into the intermediate runway 111 between the cases.

I will now describe the mechanism by which the depression of a finger key of the typewriter operates to rock the corresponding bell crank 122 or 123, to withdraw a plunger, and also initiates the mechanism to operate the rock shaft 134 or 135 to return the withdrawn plunger.

Directly beneath each typewriter key lever 15, is a lever 201, pivoted at 202 on a standard 203, rising from a frame plate 1 of the machine. A suitable upward extension 205 secured to this lever and having a shoulder directly under the key lever and close to it, causes the depression of the lever 201 whenever the key lever is depressed. A tension spring 206, acting on the rear end of each lever 201, tends to elevate the forward end. The typewriter machine is customarily provided with springs 20 (Fig. 3) acting upwardly on each key lever and adjusted by screws 21. These springs are preferably left in the machine so that the springs 206 need be no stronger than sufficient to raise the levers 201, against a suitable stopping cross bar 208.

On each lever 201 is a dog 210 pivoted to the lever at 211 and normally held in the vertical position shown, as a spring 213 pressing a pin 214 on the dog against the underside of the lever 201. This dog normally overlies a pivoted latching trigger 220 on a lever 230, which is pivoted at 231 to a frame standard 232, and extends well to the rear of that pivot into position to operate the bell cranks 122 and 123. Suitable tension springs 234 of considerable force connected to the rear portion of the lever, tends to elevate that portion and lower the forward portion. Such lowering is prevented by the latch 220 engaging an abutment bar 222, a suitable spring 223 between the latch and lever 230 normally maintaining the latch in the position shown in Fig. 3. The latch 220, it will be understood, is an L-shaped or U-shaped piece of sheet metal, embracing the lever 230 and pivoted by the pin 225.

Now, when the key lever 15 of Fig. 3 is moved downwardly, lever 201 must move downwardly, thus causing the dog 210 to press downwardly on the trigger 220. This movement swings the trigger on its pivot 225 sufficiently to release it from the abutment bar 222, whereupon the spring 234 swings the lever 230 into the position shown in Fig. 4.

Each lever 230 extends beneath a corresponding pin 240, the set of pins being slidably mounted in an oscillatable yoke 241. If this yoke is in the position shown in Fig. 3, the pins will stand beneath the forward set of bell cranks 122, and hence elevation of the rear end of the lever 230, consequent upon the actuation of the trigger by the depression of the typewriter key, will swing upwardly the horizontal arm of the corresponding crank 122, thus withdrawing the plunger 120. If, however, the yoke occupied a rearward position, as shown in Fig. 5, the movement of the same key would shove upwardly on the horizontal arm of the bell crank 123, thus withdrawing the plunger 121. The yoke 241 is connected with the shift key of the typewriter. Normally, the typewriter is operating with the lower case characters 18 on the type bars 16 and the yoke holds the pin 240, operating on the forward bell cranks 120 which are associated with the lower case type case 101. When the typewriter shift brings the characters 17 into use, the yoke 241 is automatically shifted to bring the rear type case 102 into action.

The shift connection is best shown in Figs. 8 and 9. The yoke 241 is in the form of a bale pivoted at its ends 242 to the upright plates 108 and 109 at opposite ends of the type case. Secured to the bale is a link 245 leading forwardly to a bell crank 246 which has a lip 247 extending beneath the shift lever 30 of the typewriter. As shown in Figs. 8 and 9, this shift lever is pivoted at 31 and has an upwardly extending arm 32 operating on a member 33 in the nature of a bell crank rigid with a cross rod 34 on which rides a roller 35 carried by the typewriter carriage 12.

The usual position of the shift mechanism is that shown in Fig. 8, where the lower case characters 18 of the typewriter are in position to coact with the platen roller 13, and the pin yoke 241 is in the forward position. Now, when the shift key is depressed, its lever is rocked into the position shown in Fig. 9, which, through the mechanism stated, raises the typewriter carriage to bring the platen roller into position to coact with upper case characters 17, and at the same time rocks the pin frame 241 into the rear position, as shown also in Figs. 4 and 5.

It will be understood, of course, that the particular shift mechanism on the typewriter will vary with the make of typewriter employed, but for such shift mechanism to operate the setting machine, it is only necessary to arrange the bell crank 246 or its equivalent so that it will be engaged and operated by some movable part of the typewriter shift.

I provide mechanism preventing the depression of two keys at the same time. Such mechanism may readily comprise the well known expedient of a row of balls extending transversely across a set of levers in position so that any actuated lever must pass between an adjacent pair of balls, and there being only space enough in the whole train of balls for one lever. This is illustrated in Figs. 2, 3 and 35. As there shown, 260 indicates the balls and 261, 262 a container therefor shown as comprising a grooved overhanging bar and a retaining plate. The plate and bar are slotted in their upper portions for the passage of each key lever. Suitable abutment screws 265 at the ends of the ball raceway adjust their position.

The device just described is shown as carried by the frame 1, through suitable brackets, and as located directly beneath the forward ends of the levers 201. When any such lever is depressed, as indicated in one instance in Fig. 35, the aggregate space between the balls is appropriated so that no other lever may be depressed until such depressed lever has been returned. This effectively prevents the ejection of two type at a time;

it also prevents jamming of the typewriter type bars, by preventing two keys being depressed at once. Other mechanism hereinafter described operates automatically to lock the keyboard against actuation of a subsequent key immediately after a key has been depressed. This automatic locking takes effect substantially concurrently with the return of the key-operating lever from the train of balls, so that it is not within the manual capacities of the operator, in any normal operation of the machine, to depress a second key until after the machine has completed the operation initiated by the first key.

It will be understood from the description so far given, that whenever a key of the typewriter is depressed, it prints on paper on the carriage in the usual manner, and it also operates to the corresponding trigger to cause the withdrawal of the plunger from the corresponding type channel, and the moving back of the corresponding universal plunger operating bar. The additional manual work for the operator in releasing the triggers is insignificant, and such operation throws into action suitable power mechanism which completes the ejection and transfer of the type without requiring further work of the operator. Mechanism for accomplishing this will now be described.

In the particular embodiment illustrated, the power for the machine is derived from an electric motor 300 (Fig. 2) the armature shaft 301 of which carries a pulley 302 connected by a belt 303 with a pulley 304 which constitutes the loose member of a single rotation clutch mounted on the shaft 310. Secured to the underside of the bed plate 1 of the machine are a pair of depending plates 311 and 312 (Fig. 12) suitably bracketed at their lower ends by a cross-rod 314. The shaft 310 is mounted in these vertical plates, and the clutch mechanism is mounted on the shaft between the plates.

The clutch is released by the action of any of the levers 230 which operate to raise a universal bar 250 extending across all of the levers. The releasing of the clutch gives a single rotation to the shaft 310 which, as presently explained, operates the rock shafts 134 and 135 to force inward any withdrawn plunger at the bottom of the type case, ejecting the bottommost type.

I will now describe the clutch and its immediately coacting parts as illustrated in Figs. 3 and 10 to 16 inclusive. This mechanism includes a driving member 304 which is a pulley loose on the shaft and carries an annular flange 305, which is shown as made separately and bolted to the face of the pulley; also a driven member 320, which is a collar keyed to the shaft 310 and extending within the flange 305, and has a periphery made up of several outwardly diverging portions, preferably by a short concentric portion 321, then a tangential portion 322, then an inward step 323 to the next concentric portion. The third member of the clutch comprises movable rollers 330 between the driving and driven member, and a retainer ring 331 positioning the rollers equi-distantly. The retainer 331 comprises a plate journalled on a reduced portion of the driven collar 320 and having an interrupted annular portion 332 which projects between successive rollers 330. The plate 331 is held in place against displacement by a plate 335 mounted on a hub portion 336 of the collar 320.

The plate 331 is provided with a radial shoulder 333 which rests normally on an abutment 340 controlled by the universal bar 250. A suitable tension spring 338 connects the plates 331 and 335 and is normally constrained when the shoulder 333 engages the abutment, which is the position illustrated in Fig. 15. This maintains the rollers on the concentric portions of the collar 320, so that the latter is not driven.

When the abutment is removed from the shoulder 333, the spring 338 reacts and shifts the disk 331 circumferentially with reference to the collar 320 and thus carries the rollers 330 onto the tangential portions of the collar, binding the collar to the driving pulley 304 and giving a rotation to the shaft 310. During that rotation, the abutment 340 will have been returned to normal position so that at the conclusion of the rotation the disk shoulder 330 will engage the abutment and stop the movement of the shaft at the end of a complete rotation.

Keyed on the shaft 310 is a cam member 350. This member has two disk cams nearly but not quite alike; that is to say, there is a cam 351 which is circular for over three-quarters of a circumference and then is flattened by a chord 352. The other cam 353 is circular for a slightly greater arcuate distance and is flattened by a partial chord 354 similarly placed to the chord 352, but connected at one end to the arc by a cusp 355. These cams rotate in the direction of the arrows in Figs. 10 and 11, and the cam 353 releases its roller slightly later in the movement than the cam 351.

The cam 353 coacts with a roller 360 on a lever 361 which is pivoted by a stud 363 to the depending frame plate 311. Beyond its pivot the lever is connected by a link 365 with one of the bale arms 251 of the universal bar 250.

Normally, the flattened portions of the cams 351 and 353 stand adjacent the cooperating rollers as illustrated in Figs. 10 and 11. In this position, the depression of any typewriter key results in rocking the lever 230, thereby raising the universal bar 250, and rocking the lever 361 which carries the clutch abutment 340 heretofore referred to. The result is that the roller 360 comes down in the recess of the cam 351 while the abutment 340 withdraws from the clutch shoulder 333 and the clutch is released. As the shaft 310 now rotates, the cam member 350 turns in the direction of the arrow. This raises the roller 360 as the concentric portion of the cam comes beneath it. This rocks the abutment 340 back into potential position. It also pulls down the universal bar 250. This operates to restore the actuated lever 230. After such restoration is completed, the latch 220 is swung by its spring 223 to bring its foot onto the seat provided by the recessed edge of the bar 222, relocking the lever.

The arms 251 of the universal bar 250 are rock arms on a rock shaft 370 (Figs. 21 and 31). On this rock shaft is an arm 371 carrying at its free end a pin 372. This pin extends into forks at the opposite ends of the rock arms 375 and 374 which are rigid on the rock shafts 134 and 135 which carry respectively the universal pusher bars 130 and 131.

It results from the above described mechanism that whenever the concentric portion of the cam 353 engages the roller 360, the universal pusher bars 130 and 131 are moved toward each other by power, and hence any withdrawn plunger 120 or 121 is shoved inwardly to eject the bottommost type onto the zone between the two type cases on the surface of the cross bar 110. Mechanism to be shortly described then acts to advance the ejected type toward the right hand end of the machine, where the type are assembled into a line ready for delivery onto the multigraph segment.

The action of carrying the ejected type along the runway 111 is effected by the cam 351, the operation of which will now be described. This cam acts against a roller 380 on a lever 381 pivoted at 382, (Fig. 10). This lever carries at its free end a pin 383 engaging a slot in a lever 384 pivoted at 385. The roller 380 may be given a tendency to move toward the cam by a suitable spring 386 anchored to either lever 381 or the lever 384.

The lever 384 performs several functions simultaneously. One of the most important is to lock all the latches 220 on the levers 230 so that the typewriter cannot be again operated until the type setting operation initiated thereby is completed. This prevents the possibility of transporting type by operating the keys in very rapid succession. This locking mechanism is best shown in Figs. 3, 4, 5 and 10 and will now be described.

To prevent the depression of a key lever of the typewriter during the cycle of movement of the clutch controlled cam, I provide a lock 390 which consists of a rocking plate projecting in the vicinity of the heels of the latch 220 operated by a rock arm 391. This arm is connected by a link 392 to the upper arm 393 of a bell crank which is pivoted to the frame at 394 and has a lower arm 395 connected by a link 396 with the lever 384 above referred to. The result is, that whenever the cam 351 has its concentric surface against the roller 380, the plate 390 is automatically swung upwardly behind the heels of all of the latches 220 as illustrated in Fig. 5, thus locking the latches and preventing operation of any key lever of the typewriter.

I have found that a convenient speed of rotation of the clutch is 350 revolutions per minute, and at such speed the cam moves the bar 390 to locking position in such a small fraction of a second, that it is physically impossible for the operator to depress a key in the minute theoretic interval between the release of the keys by the ball-lock and the locking by the bar.

The second operation performed by the lever 384, when actuated by the cam 351, is to lock down the universal bar 250. This is effected by the universal bar being engaged by the hooked upper end 387 of a downwardly drawn link 386 connected to the lever 384.

A third operation of the lever 384 as actuated by the cam 351 is to operate mechanism shoving downwardly on any type arriving at the end of the horizontal runway 111. This is accomplished through a link connected to the free end of the lever 384, but the explanation will be deferred until after the transfer of the type has been described.

Another operation performed by the single rotation shaft 310 is to shove the ejected type along the pathway 111 between the type cases. This is effected by a crank 410, Figs. 3, 10 and 12, on the shaft 310 which has a pin 411 pivoted in a block 412 slidable in a slot 413 in an arm 414. This arm has a slidable pivot below the crank pin by means of a second slot 415 in the arm embracing a fulcrum pin 417.

The fulcrum pin 417 is fixed in use but adjustably positioned. To this end I make this pin a crank pin on the end of a crank 416 pivotally mounted on a stud 419, and I provide suitable means for locking this crank in adjusted position. A convenient device consists of a pair of set screws 418, Fig. 30, mounted in ears carried by the plate 312 and engaging opposite sides of the crank near the pin 417.

The upper end of the arm 414 carries a roller 420 (Figs. 10 and 12) which operates in a horizontal groove 421 in a stationary bar 422 supported on posts 423 and 424 rising from the bed plate 1. The roller 421 is journalled on a screw 430 mounted in the arm 414. On the other side of the arm a bushing 431 is mounted on this screw. This bushing is pivotally connected with a block 435 which carries a horizontal bar 440 in line with the runway between the type cases just above the floor 110 therefor.

It results from the above construction that the rotation of the shaft 310 carried around the crank 410 gives an oscillation to the arm 414 which reciprocates the pusher bar 440. The movable fulcruming of the oscillating bar enables the upper end thereof to travel in a straight line. The effect of the movement of the pusher bar 440 is to shove the type which was ejected toward the right of the machine.

To prevent jamming of the mechanism in case a type should for any reason foul, I connect the arm 414 with the block 435 in such manner that it is readily detachable therefrom. As shown in Fig. 10, the bushing 431 occupies an open notch 436 in the block 435, which notch is in effect normally closed by a plunger 437 pressed upwardly by a spring 438 mounted between ears on the block. Ordinarily, the connection acts as a usual pivot, the pin rocking in its bearing, but in case there is any obstruction to the movement of the transfer bar 440, the pin 431 will simply pull out of the slot 436, camming down the plunger 437 in such movement.

When a type has been ejected, either rearwardly from the front bank of type cases, or forwardly from the rear bank of type cases, it lies on its side on the support provided by the cross bar 110. Now, the clutch operated mechanism through the crank 410 and oscillating lever 414 just described operates to advance the push bar 440 along this path. The forward end of this bar engages the ejected type and shoves it along the runway to a point adjacent the right hand side of the type cases.

The channel 111 along which the bar 440 shoves the type A terminates at its right hand end in a vertical channel 470 which curves downwardly in a quadrant form. This channel is made to fit the contour of the type sufficiently to guide it but loosely enough to allow it to drop freely, thus on opposite sides of the channel are curved ribs 471 and 472 (Figs. 17 and 26). The members supporting these ribs are cut away in front thereof to form rabbets for receiving the head of the type and are cut away to a somewhat less extent to the rear to form rabbets to receive the feet of the type. Accordingly, as the plunger 440 is operated to its extreme right hand position, the type A is shoved off of its support, and thence drops downward by gravity onto the curved chute, the rib 471 engaging one of the grooves of the type and the rib 472 the other groove.

As the type are very light, they are liable to become displaced, and I therefore provide means to true them up and control the transfer along the horizontal channel to the downward quadrant. These features will now be described with particular reference to Figs. 17, 18 and 22 to 26 inclusive.

Figure 22:
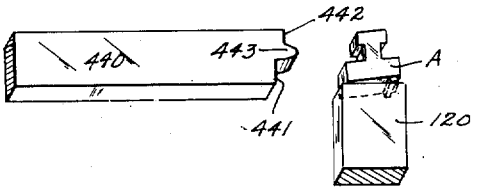
Figure 23:
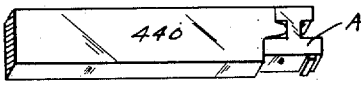
Figure 24:
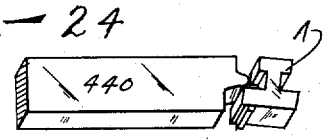
Figure 25:
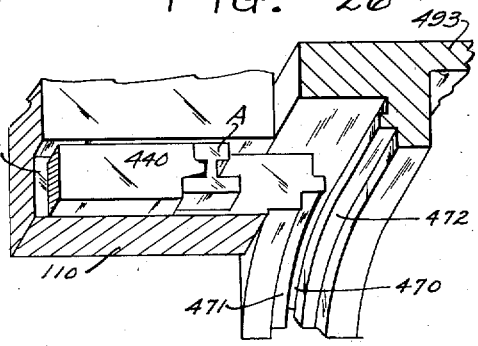

When the type are ejected forwardly from the rear case so that the plunger 121 engages the flat foot of the type, the type is likely to stand in a true position, as shown in Fig. 25. If, however, the type is ejected from the forward case rearwardly and if the character on the face of the type is at either side of the center, one type is likely to stand askew, being tipped in one direction as shown in Fig. 22 or in the opposite direction as in Fig. 24. To rectify such skewed type, I form the end of the pusher bar 440 in a peculiar manner, that is to say, it is provided with two separated shoulders 441 and 442 which are positioned to contact with the head and foot of the type when the latter is in true position as shown in Fig. 23, and beween these shoulders I provide a bevelled and rounded tongue 443 adapted to engage in the groove of the type. With such a shaped plunger if the type stands in the skewed position shown in Fig. 22, the tongue coacting with the foot of the type trues it, bringing it into the position shown in Fig. 23; while if the type stands in the position shown in Fig. 24, the tongue coacting with the head also trues the type. If the type is already true as shown in Fig. 25, the tongue does not move either the head or foot, but enters the groove idly until the shoulders 441 and 442 engage the head.

To prevent the type bouncing away from the pusher when it strikes the type, I provide means to engage the upper surface of the type and bear down lightly thereon as the type lies in the transfer channel. This channel is equi-distant from the front and rear columns of type and stands directly beneath the cross bar 105 carrying the rails 101 of the forward type case. This type channel is surmounted directly by a bar 482 carried in place back of the front rails 101 and beneath the bar 105. This bar 482 may be pressed downwardly as a whole to provide a braking action in the type, or it may carry individual detents to act in the type. The latter is the form shown in the drawings.

As shown in Figs. 3, 17 and 18 the type restraining detents preferably comprise a series of balls 480 located in a row over the type channel pressed downwardly by suitable springs 481 compressed by screws 483 all mounted in the bar 482. Fig. 18 indicates a bottom plan of the bar 482 and illustrates how the projecting portions of the balls coact with the type A, giving it a tendency to remain in true position and prevent it being thrown forward by the impact of the bar 440.

On the underside of the bar 482 near the discharge end of the type channel, I provide a leaf spring 485 which is secured by suitable screws 486 or otherwise to the underside of the bar 482 and overhangs the entrance to the channel 470 and presses the type downwardly when it comes off of its support.

To prevent the possibility of the type sticking in the curved channel 470, I provide a periodically acting packer which moves downwardly a short distance at the upper end of the type channel for each type ejected, whereby such type is positively advanced into the channel. This packer comprises a suitable finger 490 (Fig. 19) mounted on the forward end of an arm 491 which is tight on a short shaft 492. This shaft is journalled at its rear end in a suitable frame bracket 493 and at its forward end it is journalled in an axial cavity in a normally stationary rock shaft 494. A radial pin 495 on the shaft 492 occupying an arcuate slot 496 in the shaft 494 allows some independent movement of the two shafts. A coil spring 497 surrounding the shaft 492 and anchored at one end to the frame standard 493 and at the other to the arm 491 tends to move the arm upwardly.

I have heretofore commented on the link connected to the end of the cam operated arm 384, (Fig. 10). This link is designated 498, pivoted at its upper end to an intermediately pivoted lever 494 which overhangs and limits the upward movement of the finger 470.

The normal position of the parts just described is that illustrated in Figs. 10 and 17. In this position the finger 490 blocks the exit from the horizontal type channel. Now, as the cam 351 begins to act on its roller 380 (which is before the crank 410 has given much movement to the arm 414 and the bar 440) the roller 380 is shoved upwardly, the link 498 is thereby pulled downwardly, and that part of the lever 499 (Figs. 2 and 17) engaging the finger 490 is moved upwardly, whereupon the spring 497 raises the finger above the entrance to the type channel 470. This position is maintained by the concentricity of the cam 351 while the plunger 440 is shoving the type toward the right end and over the top of the channel 470 and withdrawing thereafter. Then the flattened portion 352 of the cam comes opposite the roller 380, and the latter is returned by the spring 486, which is materially stronger than the spring 497, whereupon the link 498 is raised and the member 499 comes down on the finger 490, thus positively shoving the type down into the channel.

The above described movement of the finger 470 is slight, being limited by the excess of the slot 496 over the pin 495. It is only sufficient to advance the type a distance corresponding to its thickness. The type are thus automatically forced into the quadrant channel one at a time as delivered from the type case. Then the type pass down this channel by gravity aligning with the previously formed portions of a line in the quadrant channel. The foremost type in such line stands on edge at the end of the quadrant channel as shown in Fig. 17, so that the line is at all times ready for delivery into a suitable receiving channel, which is shown as a standard multigraph segment, to be later described.

It will be noticed that the actual discharge of the individual type into the line channel 470 precedes the release of the keyboard lock heretofore described. The locking is continued after such transfer of the type until the pusher bar 440 has been returned by the crank and lever mechanism to a position beyond the type runway between the cases, so that it is impossible to operate a subsequent key lever either to eject type inadvertently or to cause a plunger to force type against the pusher bar.

The discharge of the type into the quadrant channel, and the subsequent return to normal position of the finger 490 and the pusher bar 440 completes the operation of the clutch driven parts. As the clutch is thrown out of action after rotation by the engagement of the clutch shoulder 333 with the abutment 410, it is desirable to provide some shock absorbing characteristic to the abutment to reduce the sound and jar. To effect this, I make the abutment 340 on a block 450 which has a shank 451 slidably mounted in the lever 361. A compression spring 452 about this shank maintains it normally in the position shown in Figs. 10 and 11, but enables the abutment to go down by the engaging shoulder 333 against the action of the spring 452 at the moment of impact; after which, the return of the spring brings back the clutch member 331 to normal position.

As the clutch is completing its rotation, I find it convenient to provide a brake reducing its speed and power before the abutment engages. This brake may consist of a drum 460 (Figs. 12, 13 and 14) on the shaft 310 carrying an arcuate blade 461 which travels between a pair of arcuate plates 463 clamped by screws 464 to the frame member 311 in position to provide just sufficient friction for the passage of the blade 461.

The type being ejected from the cases by the keys and forced by the transfer mechanism to the right are accumulated in the quadrant channel 470 until that channel contains a line of the desired length; after which, the whole line may be shoved bodily out of the channel onto the receiving member. The machine is preferably so proportioned that the quadrant channel 470 will carry a line of type of suitable length for a page form, and the receiving member for such line is preferably a multi-channeled member suitably indexed so that successive lines of type may be advanced into successive channels and thus a page form automatically assembled.

I prefer to use as the channeled receiving member, a standard multigraph rotary type segment, which when located may be transferred directly to a printing machine. Such segment is shown, described and claimed in Patent No. 1,122,728, issued December 29, 1914, to my assignee The American Multigraph Company, and is illustrated herein at 500 in Figs. 1, 2, 17, 28 and 29. As there shown, it comprises substantially a semi-circular segment of a drum having mounted along parallel overhanging rails 501 and having internally suitable stiffening webs 502. Mounted in these webs is a rod 503 carrying spring hooks 504. In use in a multigraph, the segment rests on two skeleton disks on a main shaft and the springs engage the shaft to hold the segment in place. In the present machine, I employ a somewhat similar arrangement of central shaft and supporting disks for holding the segment, as about to be described.

I mount a shaft 506 in a suitable frame yoke 507 carried by the bed 1, and on this shaft within the yoke I provide two disks 508 pinned to the shaft. The type segment 500 may rest on these disks and be temporarily locked thereto by the spring hooks 504 engaging the shaft 506. The portions of the disks 508 distant from the segment may be made heavier to counterbalance the weight of the segment, and if desired an additional counterweight 509 may be added on the shaft. All these counterweighted parts may be rigidly connected together by cross bars 510.

As will be seen from Fig. 17, the left hand end of the railed segment is in a plane close to the right hand end of the line channel 470. Any channel of the segment 500 may be accurately aligned with the quadrant channel 470 preferably by means of a spring detent 515, having a beveled nose which engages the end of an unoccupied channel of the segment. To transfer a line of type from the channel 470 into the aligned channel of the segment, it is only necessary to move the finger 490 through a quadrant arc. It will be remembered that this finger is carried by an arm 491 rigid on a shaft 492 which is mounted with a certain amount of loose play in the end of a normally stationary shaft 494. To move the finger, I rock this stationary shaft substantially a quarter of a rotation. This rocking movement, as the play is taken up between the slot and pin 495, carries the finger 490 downwardly within the quadrant channel to shove outwardly the line of type therein.

Any suitable mechanism may be employed for giving the desired turn to the shaft 494, but I find it convenient to extend this shaft forwardly alongside of the typewriting machine and connect it by bevel gears with a suitable handle at the side of the keyboard for operating it. The handle referred to is shown at 520 (Fig. 1), and is mounted on a shaft 521 journalled in a suitable bracket 522 carried by the frame plate 1 and is connected by bevel gearing 524 with a shaft 494. Accordingly, a simple forward pull on the lever 510 will operate to spring the finger 490 downwardly through a quadrant to discharge the line of type in the quadrant channel. A coil spring 525 anchored to the shaft 494 and bracket 522 may serve to return the lever and shaft.

I provide suitable indexing means by which the segment may be given a step by step movement to bring a fresh channel into alignment with the quadrant channel. To this end I have shown a ratchet wheel 530 rigidly secured to one of the disks 508 and coacting with this ratchet wheel is a pawl 531 mounted on a rock arm 533 pivoted on the shaft 506. The lower end of this rock arm is shown as connected by a link 535 to a disk crank 536 which is pivoted to the edge of the frame plate 1 and has an upwardly extending arm 537 formed at its end and engaged by a pin on an extension 539 of the arm which carries the handle 520.

It results from the above mechanism that when the handle 520 is drawn forward to swing down the finger 490 to discharge the line of type, the link 535 is thereby shoved rearwardly, carrying the pawl 431 idly toward the front. Then, the handle 520 is shoved rearward following the discharge of the type into the segment, this draws the link 535 forwardly and causes the pawl 531 (which a spring 532 maintains in engagement with the ratchet) to turn the ratchet wheel and segment in the direction to carry the filled channel and the segment upwardly and bring a fresh channel into alignment with the quadrant channel.

It will be seen from inspection of Figs. 1 and 2 that the type receiving segment is so mounted as to be readily visible at all times by the operator at the keyboard, the segment being approximately on the same level as the keyboard and at the side of the machine, so that the view thereof is unobstructed. This enables the operator at the keyboard to observe the page assemblage on the segment from time to time as the word progresses, which is of considerable advantage.

It is sometimes desirable to operate the typewriting machine without corresponding actuation of the type setter, and to enable this, I provide a single throwout device which entirely disconnects the typewriting machine from the typesetter. I have shown this throwout device as coupled with the switch for the electric motor 300 so that one operation may connect the typewriting machine and simultaneously close the switch to the motor or vice versa. This mechanism is shown for instance in Figs. 2, 5 and 6 and may be arranged as follows.

Suitably supported on the underside of the bed 1 near the front is a push-button switch 600 adapted to connect the incoming double conductor electric cord 601 with an outgoing double line 602 leading to the motor 300. A suitable plunger 604 when drawn out of the switch box connects these conductors. A suitable spring detent (not shown) holds the plunger in either its inner or outer position. Connected with the plunger is a link 606 terminating in a suitable knob 607 for operating it. The rear end of this link is connected to a lever 605 intermediately pivoted to the edge of the frame plate 1. The upper end of this lever carries a blade 608 which extends transversely of the typewriter beneath the lower ends of the key lever dogs 210. When the knob 607 is pulled out to connect the motor, this same movement swings the blade 609 downwardly into the idle position shown in Figs. 3, 4 and 5. When however, the knob 607 is pushed inwardly to disconnect the motor, the blade 609 is rocked upwardly into the position shown in Fig. 6 and thereby stands close to and behind the downwardly projecting tongues 212 on the dogs 210. Now when the blade 609 is in this position, whenever any key is depressed, the corresponding depression of the lever 201 brings the tongue 212 against the blade so that the dog is cammed forwardly into position to clear the latch 220. This makes it impossible for the typewriting machine to actuate the typesetter. The simple outward movement of the knob 607 thus energizes the motor and couples the typewriter to the typesetter, while the inward movement opens the motor circuit and disconnects the typewriter.

It is desirable to provide several type channels in the type case operated selectively by the same key of the typewriter. For instance, in ordinary use, a larger number of spaces is required than that of any particular printing character, so that I provide several channels of spaces, and I so connect the space bar of the typewriter that it may operate to eject spaces from any of these three channels as desired. Mechanism for this is illustrated in Figs. 32, 33 and 34. In these views 40 indicates the space bar of the typewriter and 41 the levers carrying it. 270 indicates the various levers for controlling the different space channels of the type case, these levers corresponding to the levers 201 already described for releasing connector keys. Each lever 270 carries a dog 210 co-operating with a corresponding latch 220 in the corresponding lever 230, as heretofore described. A shiftable device about to be described carried by the space bar enables it to operate any of the levers 270 as desired.

In the form shown, the shiftable connection on the space bar comprises a distance block 50 having a T-head 51 slidably mounted in a cavity 52 in the space bar 40. The lower end of this distance block is adapted to stand directly over any of the levers 270 and push down on the same when the space bar is depressed. To lock the slidable member 50 in any of its positions, I may provide it with a finger latch 55 which may occupy any of several notches 56 in the space bar. A suitable spring-pressed detent 57 (Fig. 33) may hold the latch in engaged position.

With the mechanism just described, the space key operates to discharge spaces from that channel of the type case corresponding to the position of the latch 55. Whenever that channel is exhausted, the latch is simply swung rearwardly out of its notch and then shifted longitudinally to select a different space channel. I have shown the space bar as coacting with three channels, but a different number may be used if desired. Also, a similar device might be employed to couple some of the most frequently used letter keys with a plurality of channels.

I claim:

1. The combination of a typewriter having a keyboard, character type and a paper support, of a type case adapted to contain type, a line holder adapted to receive type being assembled in a line, of power-driven mechanically released mechanism cooperating with the typewriter, the type case and the line holder for enabling the same keys of the typewriter to print on paper and discharge type from the type case and assemble it into a line.

2. The combination with a type setting machine having power mechanism for operating it and a set of levers for controlling the operation, of a standard typewriter, and means whereby finger keys thereof may actuate said set of levers, the typewriting machine standing over said set of levers but not physically attached thereto, whereby the whole typewriting machine may be removed when desired.

3. The combination with a typewriter of the standard type having finger keys and a paper carriage and type bars operated by the keys to print on paper in the carriage, of a power operated type-setting machine having triggers to release it, said triggers being associated with the keys of the typewriter for operation thereby.

4. The combination of a typewriting machine of standard type, a multigraph segment having parallel longitudinal undercut channels adapted to carry type grooved on its opposite sides, a type case adapted to contain such type, mechanism actuated by the keys of the typewriter for discharging such type from the type case onto a runway, automatically operating mechanism for then assembling it into a line, and mechanism operable at will to discharge such line into a channel of the multigraph segment.

5. The combination with a type case, of mechanism for ejecting type therefrom controlled by a clutch, a typewriter adapted to print on paper, and means actuated by the typewriter keys to select corresponding type of the type case and to release the clutch to enable the type to be ejected by power.

6. The combination with a type case, of mechanism for ejecting type therefrom controlled by a clutch, a typewriter adapted to print on paper, and means actuated by the typewriter keys to select corresponding type of the type case and to release the clutch to enable the type to be ejected by power, and mechanism operated by said clutch to engage the type ejected from the type case and transfer it to a line of type being formed.

7. In combination with a type case, a typewriting machine having a keyboard and a paper support and type to print thereon, of mechanism actuated by the keys to select the type in the type case, power mechanism released by a typewriter key to act on said type, and automatic means for locking the typewriter against action during the time the power mechanism is acting.

8. The combination with a typewriter and a type setting machine adapted to be actuated thereby, of power operated mechanism for performing some of the operations of a type setting machine, and a device for concurrently connecting to the power of the power operated mechanism and connecting the typewriter to the type setting machine, whereby when the power is disconnected the typewriting machine may be operated independently of the type setter.

9. The combination of a type case adapted to contain type, a plunger for ejecting type from the case, lever mechanism for actuating the plunger, a spring tending to operate the lever mechanism, a trigger for preventing the operation of the lever, a finger key, and means operated thereby for operating the trigger to release the lever.

10. The combination of an upright type case adapted to contain type in channels side by side, a set of plungers for ejecting the lowermost type in the channels, a set of normally constrained lever mechanisms for actuating the plungers, a set of triggers for preventing the operation of the lever mechanisms, a keyboard having character keys, and means operated thereby for operating the corresponding triggers.

11. The combination of a type case having a series of type holding channels, a set of plungers for ejecting type from the respective channels, a keyboard, normally constrained mechanism released thereby for withdrawing a plunger corresponding to the key actuated, and power mechanism operated automatically consequent upon such withdrawal to return the plunger to eject the type in front thereof.

12. The combination of a type case having channels for individual type, a series of plungers for the respective channels, a series of levers for withdrawing the plungers, a series of levers for actuating the withdrawing levers, a series of springs acting on the last mentioned levers, a series of latches normally preventing movement of the last mentioned levers, a keyboard having key levers, and mechanism actuated thereby for releasing the latches corresponding thereto.

13. The combination of a type case having channels for containing individual type, a set of plungers one for each channel, a set of individual mechanisms for withdrawing the corresponding plungers, and a universal member for returning any withdrawn plungers.

14. The combination of a type case having channels for containing individual type, a set of plungers one for each channel, a universal pusher bar for returning any withdrawn plunger, a clutch, mechanism controlled thereby for operating the pusher bar, releasable spring-actuated mechanism for withdrawing any plungers and releasing the clutch, a set of latches on said mechanism, a keyboard having key levers and a connection between the key levers and their respective latches.

15. The combination of a type case, of a lever adapted to control discharge from the case, a latch pivoted to the lever, a spring between the lever and latch tending to maintain the latch against an abutment to lock the lever, a finger key, and mechanism operated thereby for moving the latch free from the abutment to release the lever.

16. The combination of a type case, mechanism for effecting the discharge therefrom including a latch, a movably mounted dog adapted to engage the latch to release said mechanism, a key lever, a connection between the same and said dog whereby the depression of a finger key on the lever may cause the dog to move the latch to release said mechanism.

17. The combination of a type case, mechanism for effecting release of the type therefrom including members corresponding to different characters, a set of dogs for actuating said members, a keyboard, connections between the respective keys and the corresponding dogs whereby any key may effect the release of the corresponding type, and mechanism for moving all of the dogs to idle position to interrupt the connection between the keyboard and type cases.

18. The combination of a type case having channels for type, a set of release mechanisms therefor one for each character, a latch for each releasing mechanism, and means for simultaneously locking all of the latches.

19. The combination of a type case having channels for type, a set of release mechanisms therefor one for each character, a latch for each releasing mechanism, a clutch released by the operation of any one of said mechanisms, type transferring mechanism operated by the clutch, and a lock for all of the latches operated by the clutch.

20. The combination with a type case having a series of channels for type of different characters, a series of plungers for the respective channels, a corresponding series of manually releasable mechanism for withdrawing the plungers, a universal member adapted to be moved by any one of said mechanisms which is actuated, a clutch released by the movement of the member, mechanism actuated by the clutch for returning any withdrawn plunger, and means actuated by the clutch for restoring the actuated mechanism to normal position.

21. The combination of a pair of type cases one behind the other and each comprising upright channels for grooved individual type, two opposed sets of plungers located individually at the bottoms of the channels, key operated means for withdrawing the plungers, power operated means for returning any withdrawn plunger toward the region between the cases whereby the type from either case is ejected onto the same intermediate support.

22. The combination of two upright type cases one behind the other, two sets of plungers extending into the lower portion of the cases respectively, two sets of bell cranks operatively connected to the respective plungers, and having substantially horizontal arms projecting toward each other, and actuating means settable to engage and move either of the latter arms as desired.

23. The combination of two type cases one behind the other, two sets of plungers for the respective type cases, two sets of devices for withdrawing the respective plungers, a set of operating levers, one for each character, a yoke, a set of interponent pins slidably carried thereby in position to be engaged by the respective operating levers irrespective of the position of the yoke, and means for moving said yoke to bring the pins into coaction with either set of withdrawing devices.

24. The combination of two type cases, two sets of type ejecting means for the cases respectively, one set of operating levers, a yoke, a set of interponents carried thereby in position to be engaged by the respective operating levers irrespective of the position of the yoke, a keyboard having finger keys for various characters, connections between said finger keys and the operating levers, each key of the keyboard serving for upper and lower case characters, a shift key for the keyboard to change from lower to upper case, and a connection between such shift key and the yoke to move correspondingly.

25. The combination of a type case having individual channels for type, a set of plungers for the respective channels, a keyboard having finger keys, mechanism released thereby for withdrawing a plunger corresponding to the key actuated, power mechanism for returning such withdrawn plunger.

26. The combination of a type case adapted to contain type of different characters arranged in rows, a keyboard having finger keys corresponding to the different characters, individual plungers for the respective rows, individual mechanism actuated by the keys for withdrawing the plungers, and mechanism common to all of the plungers for returning any withdrawn plunger.

27. The combination of a type case having channels adapted to carry individual type, plunger mechanism actuated against the printing face of type to force the same rearwardly out of the case, and a keyboard for controlling the plunger mechanism.

28. The combination of an upright type case, a ledge alongside of the type case adjacent the lower end, a set of plungers operable at the bottom of the individual channels of the case to eject type on the ledge, and means for pressing downwardly from above the ledge on the ejected type to prevent its inadvertent displacement.

29. The combination with a type case having upright channels adapted to confine type grooved on its opposite sides, a plunger mechanism for removing type from the bottom of a channel, a ledge for supporting such removed type, a push bar for shoving the type along such ledge, said push bar having its forward end formed to rectify the position of the type if it is askew when ejected.

30. The combination of a type case having a series of channels side by side, a ledge alongside of the case, means for ejecting type from the case onto the ledge, a pusher bar, mechanism for operating it along the ledge, the forward end of the pusher bar having an intermediate tongue and two shoulders in stepped relation to each other corresponding to the head and foot of the type respectively, whereby said pusher bar may rectify the position of a skewed type.

31. The combination of a type case made up of parallel upright bars having ribs on their opposite sides whereby undercut channels are provided for grooved type, a set of plungers operating in the lower portions of said channels, a horizontal support on which said plungers are slidable at right angles to the face of the type case, said support forming a horizontal ledge extending along the type case, a reciprocating bar operable along said ledge, a keyboard, mechanism controlled thereby for selecting a plunger, withdrawing it, returning it to eject the type onto the ledge and thereafter automatically operating the bar to move said ejected type laterally, and a line channel to receive transported type one after the other.

32. In a machine of the character described, the combination of a type case, a keyboard, mechanism controlled by the keyboard for selecting a channel of the type case corresponding to the key actuated, a clutch, means whereby the operation of a said mechanism releases the clutch, a member adapted to be moved by the released clutch, and mechanism for ejecting type from the case operated by said member.

33. In a machine of the character described, the combination of a type case, an adjacent type runway, a keyboard, mechanism controlled by the keyboard for selecting a channel of the type case corresponding to the key actuated, a clutch, means whereby the operation of said mechanism releases the clutch, and mechanism operated by the released clutch for shoving along the runway type which may have been ejected thereon.

34. In a machine of the character described, the combination of a type case, a keyboard mechanism controlled by the keyboard for selecting a channel of the type case corresponding to the key actuated, a clutch, means whereby the operation of said mechanism releases the clutch, and mechanism operated by the released clutch for restoring the selecting mechanism to initial position.

35. The combination of a type case having individual type channels, plungers for ejecting type therefrom, a keyboard, a set of mechanisms one for each character operated by the respective keys for withdrawing the respective plungers, a clutch released by the actuation of any said mechanism, a cam set in rotation by said clutch, and means operated by said cam for returning any withdrawn plunger to eject the type.

36. The combination of a type case having channels for individual type, mechanism for ejecting type therefrom onto a ledge, a clutch and means for releasing it, a shaft rotated by the released clutch, a pusher bar operating along the ledge to transfer the ejected type, and mechanism operated by said shaft for moving the pusher bar, said mechanism comprising a crank on the shaft and an oscillating bar swung by said crank and connected with the pusher bar.

37. The combination of a type case having individual type channels arranged side by side, a ledge extending transversely of the channel, mechanism for ejecting type onto the ledge, a pusher bar operating along the ledge, power mechanism for operating the pusher bar, and a readily detachable mechanism between the power mechanism and pusher bar.

38. The combination of an upright type case having a series of parallel type channels, a ledge extending transversely of the channels adjacent their lower ends, plungers for ejecting type from the channels onto the ledge, a reciprocating pusher bar to shove the type along the ledge, a keyboard for selecting the plunger to be operated, a single rotation clutch released by action of the keyboard, and power mechanism operating when the clutch is active to shove the plunger to eject the type onto the ledge and to shove the pusher bar to transfer the ejected type along the ledge.

39. The combination of a type case, a set of plungers for ejecting type therefrom, key controlled means for selecting a plunger, a single rotation clutch, mechanism controlled thereby for actuating the selected plunger, a movable abutment for stopping the clutch and releasing it, a universal member actuated by any of the selecting devices for moving the abutment to release the clutch, a spring yieldingly carrying the abutment and acting as a shock absorber when the clutch engages the abutment at the end of a rotation and thereafter returning the abutment to normal position.

40. The combination of a type case having individual channels for rows of type of different character, a keyboard corresponding to the respective characters, mechanism controlled thereby for selecting a character in the type case corresponding to the key actuated, means for ejecting such selected type onto a ledge, a clutch released by the selecting mechanism, a pusher bar operated by the clutch adapted to convey the ejected type along a ledge to a line channel, and mechanism operated by the clutch to insure the type passing from the ledge into the line channel.

41. In a machine of the character described, the combination of a type case having a set of individual type arranged in channels side by side, means for ejecting type from any channel, means for moving such ejected type along a common runway to an intersecting line channel into which the type pass and accumulate in the form of a line, and mechanism operable at will to shove the line along the line channel to discharge the line.

42. The combination of a type case having type channels, means for ejecting type from any channel, means for advancing the ejected type to an intersecting line channel into which the type passes, said line channel being formed in a circular arc, an advancing finger pivoted at the center of the arc, and means for swinging it to advance the line in the line channel.

43. The combination of a type case having a set of channels side by side, key controlled mechanism for ejecting type from any channel, a ledge onto which such ejected type passes, a reciprocable bar acting along the ledge to advance the ejected type, an arcuate line channel into which the type pass one after the other, a rock shaft at the center of such arc, an arm thereon carrying a finger entering the line channel behind the type, and means for rocking said shaft to advance the line.

44. In a machine of the character described, the combination of means for moving type along a runway to a line channel, a finger entering the line channel behind the type, means for giving said finger short movements corresponding to the thickness of the type for each type entering the channel, and means whereby said finger may be given a long movement to shove the line from a channel.

45. The combination of a type case having a series of channels side by side, means for ejecting type from the individual channels onto a common runway, means for advancing the type along the runway, a line channel into which such individual type passes and accumulates to form a line, a multi-channeled type holder at the other end of the line holder, mechanism for shoving the line of type as a whole from the line holder into the multi-channeled holder, and mechanism for advancing the multi-channeled holder to bring a fresh channel into registration with the line holder.

46. The combination of a type case having a series of parallel channels, means for ejecting type from any channel onto a common runway, means for advancing such ejected type along the runway, a line channel into one end of which the type pass, a multigraph segment supported on an axis with a channel in registration with the other end of the line channel, mechanism for shoving type along the line channel onto the segment, and mechanism for indexing the segment.

47. The combination of a line channel into which the type pass one by one and accumulate to form a line, a multigraph segment, means for supporting it with one of its channels in registration with the other end of the line channel, a member for shoving the line of type in the line channel onto the segment, a manual device operating by one movement to move the member to advance the line onto the segment and by another movement to index the segment.

48. The combination of a type case, mechanism for effecting release of the type therefrom including a keyboard, connections controlled by the keys, and power mechanism including an electric motor controlled by said connections, a motor switch, and mechanism connected therewith for simultaneously opening the switch and interrupting the connection between the keyboard and type cases.

49. The combination of a type case having a series of channels for individual type in rows, mechanism for discharging such type including power operated plungers and a series of key operated levers for selecting the plunger corresponding to the key actuated, a motor for supplying the power, a switch for the motor, forming the connection between the keys and said levers, a universal bar adapted to move all of the dogs into an inactive position, and a manual device for simultaneously operating the switch and the universal bar.

50. In a keyboard type setting machine, the combination of means to prevent the actuation of two keys at a time, and means for locking the keyboard against subsequent action after one key has been actuated and returned.

51. The combination of a type case, a keyboard mechanism preventing the actuation of two keys at a time, mechanism actuated by a key for releasing type from the type case, and a lock for the keyboard operating consequent upon the operation of a key and becoming effective before there has been a sufficient interval, after such key is released from the action of the first named mechanism, for the operator to depress a subsequent key.

52. The combination of a type case, finger keys, mechanism initiated by the keys and completed by power for ejecting type from the type case, and mechanism for automatically locking the keyboard when a key has been actuated and continuing such locking until after the ejection of the type has been completed.

53. The combination of a type case, a keyboard, mechanism actuated by the keyboard and controlling the ejection of type from its case, a line channel, automatic mechanism for transferring the ejected type to the line channel, and a lock for the keyboard operating consequent upon the actuation of one key and causing the locking of the keys until after the ejected type has entered the line channel.

54. The combination of a type case, a keyboard, mechanism actuated thereby for ejecting type from the type case onto a runway, a reciprocating pusher for moving such ejected type along the runway, and a lock for the keyboard operating consequent upon the operation of a key and continuing until the pusher has withdrawn from the runway.

55. The combination of a type case having type of different character, a set of mechanisms actuated thereby for ejecting type from the type case, a runway onto which such type are ejected, a transfer mechanism for moving the individual type on the runway, a line channel into which such type pass, and mechanism for locking the other levers of the set until the ejected type has entered the line channel.

56. The combination of a type case having channels for different type, mechanism for ejecting type therefrom, a set of levers for operating said mechanism, triggers for releasing said levers, and an automatic lock for said triggers operating consequent upon the actuation of any one of them.

57. The combination of a type case, mechanism for ejecting type therefrom, a set of levers for operating said mechanism, triggers for releasing said levers, another set of levers for operating the triggers, a train of balls having limited play for locking the last mentioned levers whenever one lever has been actuated, and an automatically moved bar for locking the triggers.

58. The combination of a type case having channels for different type, mechanism for ejecting type therefrom, a set of levers for operating said mechanism, triggers for releasing said levers, and another set of levers for operating the triggers.

59. The combination of a type case, mechanism for ejecting type therefrom, a set of normally constrained levers for operating said mechanism, a trigger carried by each lever, another set of levers, and means carried thereby for operating the triggers.

60. The combination of a type case, mechanism for ejecting type therefrom, a normally constrained set of levers for operating said mechanism, a trigger carried by each lever and pivoted thereto, another set of levers directly over the constrained levers, a movable dog on each of said upper levers adapted to engage the corresponding trigger on depression of the upper lever or to clear the triggers according to the position of the dog.

61. The combination with a typewriter having finger keys, a paper support and means operated by the keys for printing on paper, of a type setting machine, movable controlling members mechanically connected with the type setting machine, and triggers actuated by the typewriter keys for releasing normally constrained mechanism to cause a power device to discharge a type corresponding to a character printed by the typewriter.

62. The combination of a typewriter having a keyboard, character type and a paper support, of a type case adapted to contain type, a printing member adapted to receive type assembled in lines, of trigger mechanism cooperating with the typewriter, power mechanism released by the trigger mechanism and cooperating with the type case for enabling the same keys of the typewriter to print on paper and discharge type from the type case and assemble it into a line, and means for thereafter moving such line onto the printing member.

63. The combination of a double type case having one part for lower-case characters and another for upper-case characters, and a support for discharged type common to both cases, of a typewriting machine of the standard type having finger keys, type bars operated thereby, a paper carriage and a shift mechanism to select upper and lower case characters, mechanism operated by the keys of the typewriter for selecting type in the type case including two sets of oppositely acting discharge devices, and a coupling between the shift mechanism of the typewriter and the selection mechanism of the type setter to render active the corresponding set of discharge devices.

64. The combination with a typewriter having keys, a paper support, printing mechanism and a shift key, of two parallel type cases spaced apart, an intermediate type support common to both cases, individual discharge mechanisms for the two cases arranged in two oppositely acting groups, means associated with the different keys of the typewriter for initiating the operation of the corresponding discharge mechanism, there being a movable interponent included in said mechanism, and a connection between said interponent and the shift key of the typewriter.

65. In a keyboard type setting machine, power discharge mechanism for the type, and mechanical means to prevent being assembled in an order different from that corresponding to the order in which the keys were struck by the operator.

66. The combination of a type case, finger keys, mechanism controlled by the keys for releasing type from the type case and mechanism for automatically locking the keyboard after a key has been depressed and continuing such locking after such key has been released.

67. In a power operated keyboard released type setting machine, mechanism operated consequent upon the actuation of a key and acting to lock the key against subsequent actuation before the lapse of a sufficient interval for it to be within the manual capabilities of the operator to cause subsequent actuation, said mechanism continuing the locking after the actuating key has been released.

68. The combination of a type-case, finger keys, power operated mechanism controlled by the keys for relasing type from the type case, and mechanism which automatically locks the keyboard after a key has been depressed and before there has been a sufficient interval of time for the operator to depress a subsequent key, and continues such locking after such key has been released.

69. The combination of a type case having channels for containing type of different characters, a set of levers for controlling the ejection of type from the type case, mechanism thrown into action by the operation of any lever for locking the other levers of the set, a keyboard for operating such levers, and an interlock for the keys of the keyboard preventing the depression of more than one key at a time.

70. The combination of a type case having a plurality of channels for carrying individual type, a typewriting machine having finger keys and mechanism associated therewith for making a typewritten impression, ejecting mechanism for the respective channels controlled by the keys of the typewriting machine, there being a plurality of channels of the type case apportioned to a single character, and settable mechanism associated with the corresponding key of the typewriting machine whereby such key may be coupled at will with any of said plurality of channels of the type case.

71. The combination of a type case having channels for different characters, there being a plurality of channels apportioned to space characters, a typewriting machine of the standard type having a shiftable carriage and spacing mechanism for operating it controlled by a manually operable space bar, mechanism actuated by the finger keys of the typewriting machine for releasing character type from the type case and by the space bar of the typewriting machine for releasing spaces from the type case, and settable mechanism on the space bar to couple it with any one of the type case channels apportioned to spaces.

72. The combination of a type case having a plurality of channels for carrying individual type, a keyboard, ejecting mechanism for the respective channels controlled by the keys of the keyboard, there being a plurality of channels of the type-case apportioned to a single character, and settable mechanism directly associated with the corresponding key of the keyboard whereby such key may be coupled at will with any of a plurality of channels of the type-case.

73. The combination of a type case having a plurality of channels for carrying individual type, a keyboard, ejecting mechanism for the respective channels controlled by the keys of the keyboard, there being a plurlaity of channels of the type-case apportioned to a single character, and settable mechanism positioned to be operated by the operator's hand when on the keyboard enabling a key to be coupled at will with any of a plurality of channels of the type-case.

74. The combination of a type case having channels for different characters, there being a plurality of channels apportioned to space characters, a keyboard having a space bar, mechanism actuated by the finger keys of the keyboard for releasing character type from the case and by the space bar for releasing spaces from the case, and settable mechanism positioned to be operated by the operator's hand when on the space bar to couple it with any one of the type case channels apportioned to spaces.

75. The combination of a type case having channels for different characters there being a plurality of channels apportioned to space characters, a keyboard having a space bar, mechanism actuated by the finger keys of the keyboard for releasing character type from the case and by the case bar for releasing spaces from the case, and settable mechanism mounted on the space bar to couple it with any one of the type case channels apportioned to spaces.

76. In a typesetting machine, a magazine provided with type-receiving grooves apportioned among different character type, and a plurality of grooves to receive spacing quads, a plurality of independent levers, ejecting mechanism for the respective space-quad grooves connected with the respective levers for actuation by such levers, a space bar, and a movable distance piece between the space bar and any one of said levers, enabling the operation of a selected lever by the space bar.

77. In a typesetting machine, a magazine provided with type-receiving grooves apportioned among different character type, and a plurality of grooves to receive spacing quads, a plurality of independent levers, ejecting mechanism for the respective space quad grooves connected with the respective levers for actuation by such levers a space bar and a slidable distance piece mounted on the space bar enabling it to coact with any one of said levers as desired when the space bar is depressed.

78. In a type-setting machine, a magazine provided with type receiving grooves and two grooves to receive spacing quads, a pair of members for ejecting said quads, one member for each quad groove, a pair of levers, one lever connected with each ejecting member to actuate the latter, a space bar in front of said levers, and shiftable means on said space bar for engagement with one or the other of said levers to actuate a selected quad ejecting member when the space bar is depressed.

79. In a type-setting machine, the combination of a case having a plurality of channels, a manual operating member, means actuatable thereby for ejecting type from either of said channels, and a shifting device mounted on the operating member for determining which channel shall be active, said device being readily movable by the operator's hand while on said operating member.

80. In a type-setting machine, the combination of a case having a plurality of channels for holding space type, a keyboard having a space bar, means for ejecting spaces from either of said type channels by the operation of the space bar, and a shifting device mounted on a space bar for determining which channel shall be active.

CLIFTON CHISHOLM.